US 8,829,878 B2

(12) United States Patent
Noda

(10) Patent No.: US 8,829,878 B2
(45) Date of Patent: Sep. 9, 2014

(54) SWITCHING REGULATOR AND ELECTRONIC DEVICE INCORPORATING SAME

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 241 days.

(21) Appl. No.: 13/459,329

(22) Filed: Apr. 30, 2012

(65) Prior Publication Data

US 2012/0299562 A1 Nov. 29, 2012

(30) Foreign Application Priority Data

May 27, 2011 (JP) ................. 2011-119419

(51) Int. Cl.
*G05F 1/00* (2006.01)
*H02M 3/158* (2006.01)

(52) U.S. Cl.
CPC .......... *H02M 3/1588* (2013.01); *Y02B 70/1466* (2013.01)
USPC ....................................................... 323/284

(58) Field of Classification Search
None
See application file for complete search history.

(56) References Cited

U.S. PATENT DOCUMENTS

| 2007/0057655 | A1* | 3/2007 | Nishida ......................... 323/282 |
| 2008/0111530 | A1* | 5/2008 | Hasegawa et al. ............. 323/284 |
| 2010/0194369 | A1* | 8/2010 | Nagai et al. ................... 323/284 |
| 2010/0213911 | A1 | 8/2010 | Oki |
| 2011/0043175 | A1* | 2/2011 | Sohma .......................... 323/282 |
| 2011/0089925 | A1* | 4/2011 | Ishida et al. .................. 323/285 |
| 2012/0274296 | A1* | 11/2012 | Higuchi et al. ................ 323/282 |
| 2013/0088208 | A1* | 4/2013 | Noda ............................ 323/271 |

FOREIGN PATENT DOCUMENTS

| CN | 101183828 | 5/2008 |
| CN | 101419255 | 4/2009 |
| CN | 101548456 | 9/2009 |
| JP | 2007-174884 | 7/2007 |
| JP | 2010-200450 | 9/2010 |
| JP | 2010-226930 | 10/2010 |

OTHER PUBLICATIONS

Chinese official action dated Apr. 1, 2014 in corresponding Chinese patent application No. 2012 10 16 0357.7.

* cited by examiner

*Primary Examiner* — Timothy J Dole
*Assistant Examiner* — Monica Mata
(74) *Attorney, Agent, or Firm* — Cooper & Dunham LLP

(57) ABSTRACT

A switching regulator includes a first switching element connected between an input terminal and an output terminal; a second switching element connected between the output terminal and a ground; a switching-time control circuit to generate a first switching-time control signal indicating finish timing of an ON-period of the first switching element, based on a ratio of a length of the ON-period of the first switching element to a sum of lengths of ON-periods of the first and second switching elements; a comparator generate a second switching-time control signal indicating finish timing of the ON-period of the second switching element when a feedback voltage is smaller than a reference voltage; and a switching-element control circuit to control switching of the first and second switching elements so that the first and second switching elements are turned on complementarily based on the first and second switching-time control signals.

20 Claims, 15 Drawing Sheets

SWITCHING REGULATOR AND ELECTRONIC DEVICE INCORPORATING SAME

CROSS-REFERENCE TO RELATED APPLICATION

This patent application is based on and claims priority pursuant to 35 U.S.C. §119 to Japanese Patent Application No. 2011-119419, filed on May 27, 2011 in the Japan Patent Office, the entire disclosure of which is hereby incorporated by reference herein.

BACKGROUND

1. Technical Field

The present disclosure relates to a switching regulator to supply voltage to a load circuit (e.g., CPU) with a high degree of accuracy, and an electronic device employing the switching regulator. More particularly, to a switching regulator that keeps a switching frequency and an output voltage constant even when an input voltage and an output current are changed.

2. Description of the Related Art

At present, a variety of different applications are typically installed in mobile phones. The applications themselves tend to consume battery power at very high rates, and as a result, a power supply circuit whose external components are compact while at the same time able to handle large currents and low output voltages is needed. In addition, improvements in discharge characteristics of the lithium ion battery used as a primary power supply on the mobile phone side have widened the voltage range available for input to the power supply circuit. Further, it is now common to optimize the operating speed and power consumption of a load circuit (e.g., CPU) connected to an output terminal of the power supply circuit by changing a set voltage of the power supply circuit depending on the operation state of the CPU. Therefore, a power supply circuit that can keep the output voltage constant even when an input voltage, an output voltage, or an output current is changed is required.

FIG. 11 is a circuit diagram illustrating a conventional switching regulator 1P. The switching regulator 1P is one example of a ripple detection-type switching regulator having a switching element whose length of ON-period is fixed. FIG. 12 is a circuit diagram illustrating a switching time control circuit 3P in the switching regulator 1P shown in FIG. 11. FIG. 13 is a timing chart illustrating operation of the switching regulator 1P show in FIG. 11.

In FIG. 11, the switching regulator 1P includes a switching-element control circuit 2, a comparator 6, a switching-time control circuit 3P, an input terminal TI to which an input voltage VIN is input, an output terminal LX, a switching element SW1 connected between the input terminal TI and the output terminal LX, a switching element SW2 connected between the output terminal LX and a ground voltage, a dividing circuit 7 including a dividing resistor 8 having resistance Rf1 and a dividing resistor 9 having resistance Rf21, and a feedback terminal TF. Further, the switching-element control circuit 2 includes a RS flip-flop circuit 22 and a control-signal generation circuit 23.

Further, in FIG. 12, the switching-time control circuit 3P includes a reference current source 51 that has one terminal connected to the input terminal TI and outputs a predetermined reference current Ic, a capacitor 52 connected between the reference current source 51 and the ground voltage, having a capacitance Cc, a switching element SW5 connected in parallel to the capacitor 52, a voltage source 54 to output a predetermined reference voltage VR, and a comparator 43.

In FIG. 11, the output voltage output from the output terminal LX is output to a load circuit 10 (e.g., CPU) via a high-frequency removal and smoothing low-pass filter 15 constituted by an inductor 12 having inductance L and the output capacitor 14 having capacitance Cout. Herein, the resistor 13 that has resistance Resr is a serial equivalent parasitic resistor of the output capacitor 14. The output voltage VOUT from the low-pass filter 15 is input to the switching regulator 1P via the feedback terminal TF and is divided by the dividing circuit 7.

Then, the feedback voltage VF after dividing is output to an inverting input terminal (−) of the comparator 6. The comparator 6 compares the feedback voltage VF with a predetermined reference voltage VR input from the voltage source 11 to the non-inverting input terminal (+) of the comparator 6. The comparator 6 outputs a low-leveled switching-time control signal CMPO-P to a set terminal S of the RS flip-flop circuit 22 when the feedback voltage VF is greater than the reference voltage VREF, while the comparator 6 outputs a high-leveled switching-time control signal CMPO-P to the set terminal S of the RS flip-flop circuit 22 when the feedback voltage VF is smaller than the reference voltage VREF. Herein, the high-leveled switching-time control signal CMPO-P, serving as the second switching-time control signal, indicates a finish timing of an ON-period of the switching element SW2.

With reference to FIG. 12, the switching-time control circuit 3P generates a switching-time control signal TON-P indicating a finish timing of an ON-period of the switching SW1 for output to a reset terminal R of the RS flip-flop circuit 22. In addition, an output signal PSET from the RS flip-flop circuit 22 is output to the control-signal generation circuit 23. The control-signal generation circuit 23 generates a switching-element control signal PDRV to control switching of the switching element SW1 and a switching-element control signal NDRV to control switching of the switching element SW2 so that the ON-period of the switching element SW1 is finished when the output signal PSET falls, and the ON-period of the switching element SW2 is finished when the output signal PSET rises, and the switching elements SW1 and SW2 are turned on and off complementarily. In addition, the control-signal generation circuit 23 generates an output signal TCHGB1 in synchrony with the switching-element control signal PDRV and output the output signal TCHGB1 to the switching-time control circuit 3P. It is to be noted that the switching element SW1 is turned on in response to a low-leveled switching-element control signal PDRV and is turned off in response to a high-leveled switching-element control signal PDRV. In addition, the switching element SW2 is turned on in response to a high-leveled switching-element control signal NDRV and is turned off in response to a low-leveled switching-element control signal NDRV. The switching elements SW1 and SW2 are controlled so that the switching element SW2 is turned on when the switching element SW1 is turned on and the switching element SW1 is turned on when the switching element SW2 is turned off.

In FIG. 12, the voltage source 54 generates a predetermined reference voltage Vr for output to an inverting input terminal (−) of the comparator 53. The voltage VC at the junction node between the reference current source 51 and the capacitor 52 is output to a non-inverting input terminal (+) of the comparator 53. The output signal TCHGB1 is output to a gate of the switching element SW5. Therefore, the switching element SW5 is turned off in response to the output signal TCHGB1 while the switching element SW1 is on state. On the contrary, the switching element SW5 is turned on while the switching element SW1 is off state. In addition, the comparator 53 compares the voltage VC with the reference voltage VR. The comparator 53 outputs a high-leveled switching-time control signal TON-P when the voltage VC is greater than the reference voltage VR, and outputs a low-leveled switching-time control signal TON-P when the voltage VC is smaller than the reference voltage VR.

In FIG. 11, when the feedback voltage VF becomes smaller than the reference voltage VREF, the voltage level of the switching-time control signal CMPO-P from the comparator 6 becomes high. In response to this operation, the RS flip-flop circuit 22 is set, and the voltage level of the output signal PSET becomes high. Then, the control-signal generation circuit 23 generates the switching-element control signals PDRV and NDRV so that the switching element SW1 is on state and the switching element SW2 is off state. In response to this operation, while the switching element SW1 is turned on, the switching element SW2 is turned off, and energy is charged in the inductor 12 by a difference voltage between the input voltage VIN and the output voltage VOUT. Accordingly, an inductor current in the inductor 12 is increased, and the output voltage VOUT is increased by the output capacitor 14 and its serial equivalent parasitic resistor 13.

Subsequently, when the ON-period of the switching element SW1 has elapsed at a predetermined time, the voltage level of the switching-time control signal TON-P changes from low to high. In response to this, the RS flip-flop circuit 22 is reset, and the voltage level of the output signal PSET from the RS flip-flop circuit 22 becomes low. The control-signal generation circuit 23 generates the switching-element control signals PDRV and the NDRV so that the switching element SW1 is turned off and the switching element SW2 is turned on. In response to this, while the switching element SW1 is turned off, the switching element SW2 is turned on, and the energy in the inductor 12 is released by the difference voltage between the ground voltage and the output voltage VOUT. Accordingly, as the inductor current in the inductor 12 is decreased, the output voltage VOUT is decreased by the capacitor 14 and its serial equivalent parasitic resistor 13.

Herein, a length of the ON-period "ton1" of the switching element SW1 is determined as follows. In FIG. 12, while the switching element SW1 is off state in response to the low-leveled switching-element control signal PDRV, the switching element SW5 is turned off in response to the output signal TCHGB1 in synchrony with the switching-element control signal PDRV, and the capacitor 52 is charged at the reference current Ic. The comparator 53 compares the voltage VC across the charged capacitor 52 with the reference voltage VR. The comparator 53 outputs a high-leveled switching-time control signal TON-P when the voltage VC is greater than the reference voltage VR, and outputs a low-leveled switching-time control signal TON-P when the voltage VC is smaller than the reference voltage VR. In addition, in a period during which the switching element SW1 is off and the switching element SW2 is on, the switching element SW5 is turned on in response to the high-Leveled output signal TCHGB1 from the control-signal generation circuit 23, and the charge in the capacitor 52 is all discharged.

At this, a length of an ON-period "ton1" of the switching element SW1 is obtained as follows.

$$ton1 = Cc \times VR/Ic \quad (1)$$

As described above, in the switching regulator 1P shown in FIG. 11, the length of the ON-period ton1 of the switching element SW1 is determined in response to the switching-time control signal TON-P, and a length of an OFF-period "toff1" of the switching element SW1 is determined by the switching-time control signal CMPO-P from the comparator 6 as a comparison result between the feedback voltage VF and the reference voltage VREF. As described above, by repeating on and off of the switching elements SW1 and SW2, the switching regulator 1P controls the output voltage so that a time-averaged voltage VOUTa of the output voltage VOUT is set to be constant.

However, in the circuit configuration shown in FIG. 11, since the length of the ON-period ton1 is a fixed value as calculated by formula 1, the amount of increase Δφon in magnetic flux of the inductor 12 when the switching element SW1 is on and the amount of decrease Δφoff in the magnetic flux of the inductor 12 when the switching element SW1 is off are calculated by the following formulas, using the input voltage VIN, the output voltage VOUT, an on-resistance Ron of the respective switching elements SW1 and SW2, and an inductor current IL of the inductor 12.

$$\Delta\phi on = (VIN - IL \times Ron - VOUT) \times ton1 \quad (2)$$

$$\Delta\phi off = (VOUT + IL \times Ron) - toff1 \quad (3)$$

In addition, as the amount of the increase Δφon in the magnetic flux is equal to the amount of decrease Δφoff therein (Δφon=Δφoff), a switching cycle tsw (tsw=ton1+toff1) can be calculated as follows:

$$tsw = \frac{VIN \times ton1}{VOUT + IL \times Ron} \quad (4)$$

Accordingly, a switching frequency fsw holds:

$$fsw = \frac{1}{tsw} = \frac{VOUT + IL \times Ron}{VIN + ton1} \quad (5)$$

As is clear in the formula 5, as the input voltage VIN, the output voltage VOUT, the inductor current IL (output current Iout to the load circuit 10) fluctuate, the fluctuation in the switching frequency fsw becomes greater. In addition, a time-averaged voltage VOUTa of the output voltage VOUT cannot be kept constant, which degrades the accuracy of the output voltage.

For example, as illustrated in FIG. 13, representing a first switching cycle tsw1 as a cycle when the output current IOUT is a first current I1, and a second cycle tsw2 as a cycle when the output current IOUT is increased to a second current I2 (I1<I2), the second switching cycle tsw2 that is longer than the first switching cycle tsw1 (tsw1>tsw2) because the first current I1 is smaller than the second current I2. In other words, the switching frequency fsw1 when the output current IOUT is first current I1 is greater than the switching frequency fsw2 when the output current IOUT is second current I2. As is clear in FIG. 13, when the output current IOUT is increased from the first current I1 to the second current I2, the time-averaged voltage VOUTa of the output voltage VOUT (corresponding to the feedback voltage VF) is decreased. Similarly, as is clear in formulas 4 and 5, when the input voltage VIN or the output current IOUT (corresponding to the inductor current IL) is changed, the switching frequency fsw and the output voltage VOUT are changed.

JP-2010-200450-A proposes a configuration in which a power supply device alleviates the influence from an input voltage, an output voltage, and the output current, and improves the accuracy of the switching frequency. In this example, the power supply device controls respective switching elements based on the input voltage, the output voltage, and the output current to improve characteristics of the output voltage.

FIG. 14 is a circuit diagram illustrating this conventional power supply device 1000. FIG. 15 is a circuit diagram illustrating a $T_{ON}$ generator 102 in the power supply device 1000 shown in FIG. 14. In FIG. 14, the power supply device 1000 includes a current detection circuit 108 to feedback an output current Io. In FIG. 15, the $T_{ON}$ generator 102 includes a resistor network to feedback an input voltage $V_{IN}$, operation amplifiers 121 and 127, a resistor network to feedback to an output voltage Vo, and an adder 128 to add a voltage corresponding to the output voltage Vo and a voltage Vs corresponding to the output current Io. With this configuration, the chip size and current consumption may be increased. Therefore, the power supply 1000 is not suitable for the power supply circuit used for the portable device that is required to be compact and low current consumption.

In addition, a switching frequency fsw in the power supply circuit 1000 is obtained as below, using an input voltage $V_{IN}$ and an inductor current $I_{LX}$ flowing through a transistor 151, with reference to FIGS. 14 and 15.

$$fsw = \frac{V_{IN}}{(V_{IN} - I_{LX} \times k)} \quad (6)$$

The constant number k in the formula is determined by the element values of the respective elements constituting the current detection circuit 108 and the $T_{ON}$ generator 102. That is, the switching frequency fsw is determined by the values of the input voltage $V_{IN}$ and the inductor current $I_{LX}$, and accordingly, the switching frequency cannot be eliminated from the dependency on the input voltage $V_{IN}$ and the output voltage Vo completely.

BRIEF SUMMARY

In one aspect of this disclosure, there is a provided novel switching regulator to convert an input voltage into a predetermined output voltage. The switching regulator includes an input terminal, an output terminal, a first switching element, a second switching element, a switching-time control circuit, a first comparator, and a switching-element control circuit. The input voltage is input to the input terminal. The output voltage is output to the output terminal. The first switching element is connected between the input terminal and the output terminal. The second switching element is connected between the output terminal and a ground. The switching-time control circuit generates a first switching-time control signal indicating finish timing of an ON-period of the first switching element, based on a ratio of a length of the ON-period of the first switching element to a sum of lengths of ON-periods of the first switching element and the second switching element. The first comparator compares a feedback voltage corresponding to the output voltage with a predetermined first reference voltage and generates a second switching-time control signal indicating finish timing of the ON-period of the second switching element when the feedback voltage is smaller than the first reference voltage. The switching-element control circuit controls on/off operation of the first switching element and the second switching element so that the first switching element and the second switching element are turned on complementarily based on the first switching-time control signal and the second switching-time control signal.

In another aspect of this disclosure, there is a provided novel switching regulator to convert an input voltage into a predetermined output voltage. The switching regulator includes the input terminal, the output terminal, the first switching element, the second switching element, a first comparator, a switching-time control circuit, and a switching-element control circuit. The first comparator compares a feedback voltage corresponding to the output voltage with a predetermined first reference voltage and generates a first switching-time control signal indicating finish timing of an ON-period of the first switching element, when the feedback voltage is smaller than the first reference voltage. The switching-time control circuit generates a second switching-time control signal indicating finish timing of an ON-period of the second switching element, based on a ratio of a length of the ON-period of the second switching element to a sum of lengths of the ON-periods of the first switching element and the second switching element. The switching-element control circuit controls on/off operation of the first switching element and the second switching element so that the first switching element and the second switching element are turned on complementarily based on the first switching-time control signal and the second switching-time control signal.

BRIEF DESCRIPTION OF THE DRAWINGS

The aforementioned and other aspects, features and advantages are better understood by reference to the following detailed description when considered in connection with the accompanying drawings, wherein.

DETAILED DESCRIPTION OF PREFERRED EMBODIMENTS

Figure 1:
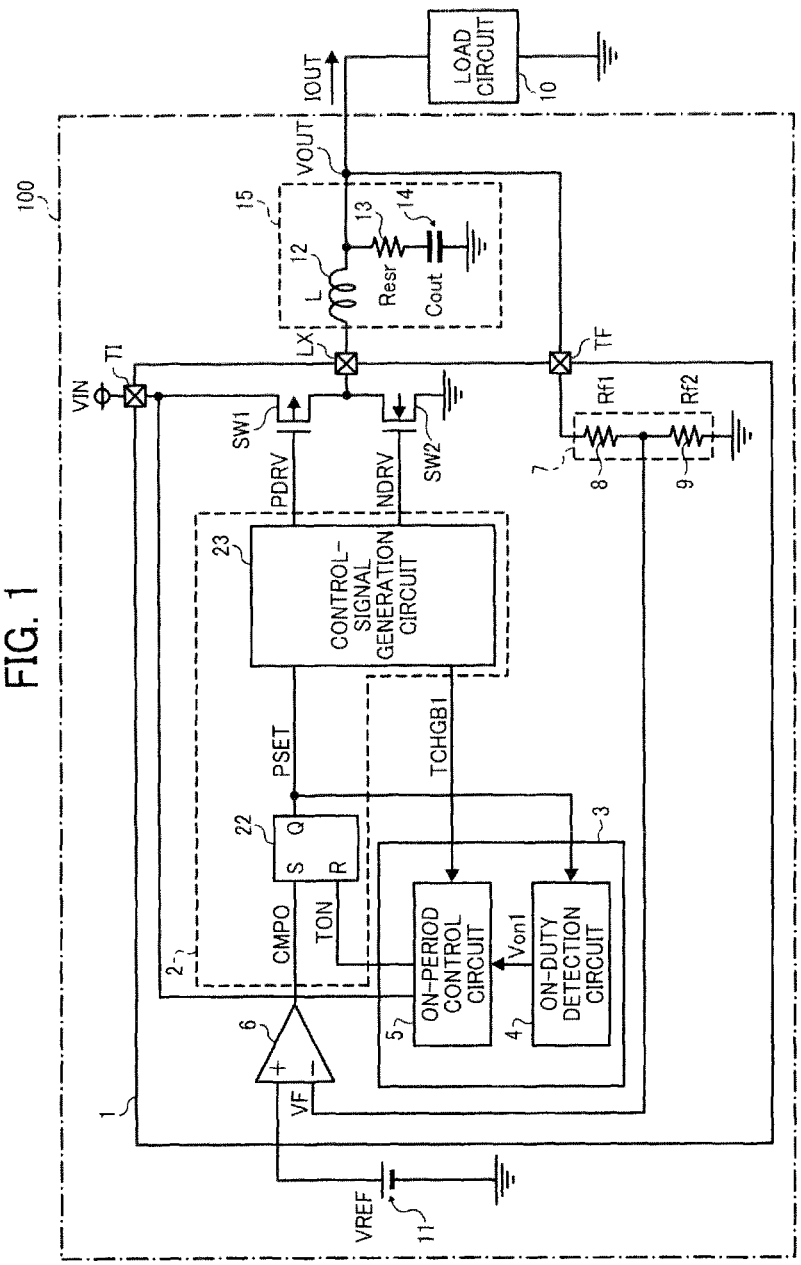
FIG. 1 is a circuit diagram illustrating a configuration of a switching regulator according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIGS. 1 through 10, an error amplification circuit according to an illustrative embodiment is described.

First Embodiment

Figure 2:
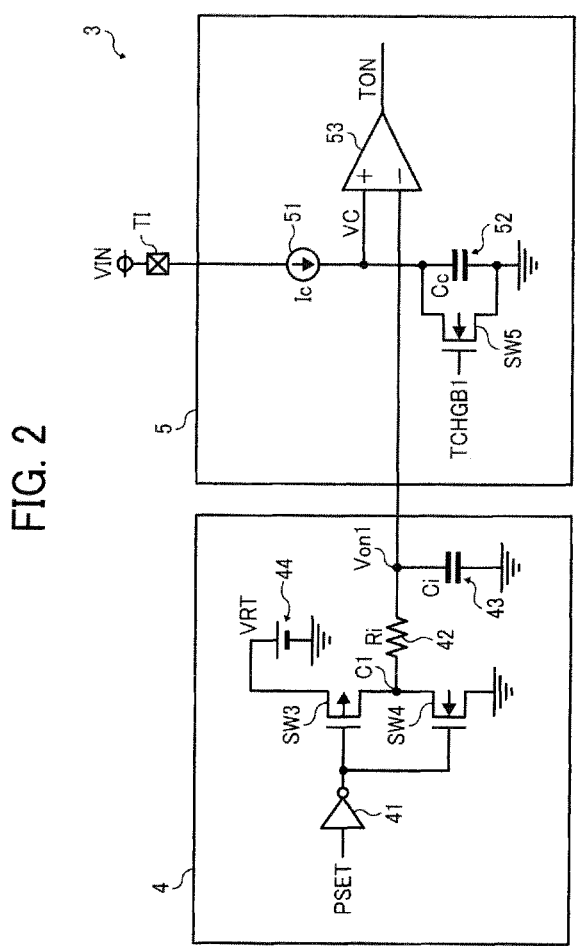
FIG. 2 is a circuit diagram illustrating a configuration of a switching-time control circuit in the switching regulator shown in FIG. 1.
Figure 3:
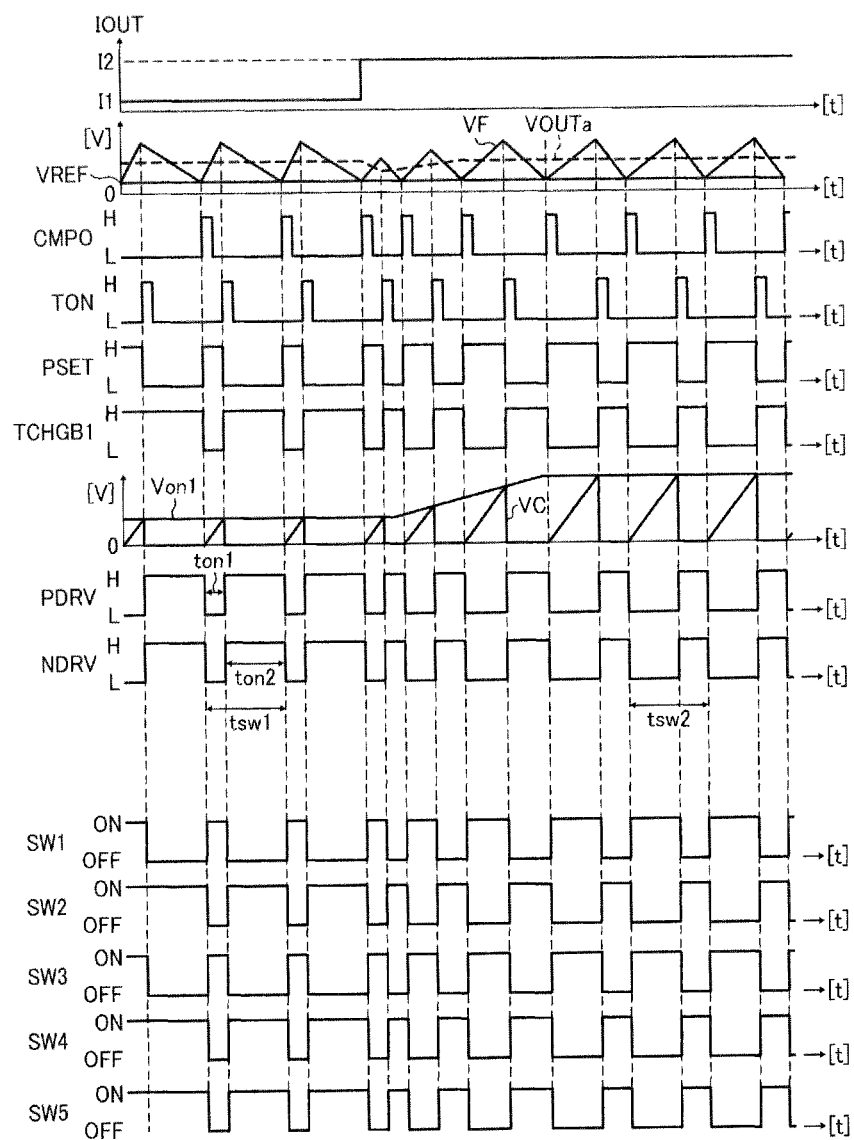
FIG. 3 is a timing chart illustrating operation in the switching regulator shown in FIG. 1.

FIG. 1 is a circuit diagram illustrating the configuration of a switching regulator 1 according to a first embodiment. FIG. 2 is a circuit diagram illustrating the configuration of a switching-time control circuit 3. FIG. 3 is a timing chart illustrating operation in the switching regulator 1 shown in FIG. 1.

In FIG. 1, the switching regulator 1 includes a switching element control circuit 2, a switching-time control circuit 3, a comparator 6, switching elements SW1 and SW2, a dividing circuit 7 including a dividing resistor 8 having resistance Rf1 and a dividing resistor 9 having resistance Rf2, an input terminal TI to which an input voltage VIN is input, an output terminal LX, and a feedback terminal TF. The switching regulator 1 may be employed in an electronic device 100. The switching element control circuit 2 includes a RS flip-flop circuit 22 and a control-signal generation circuit 23. In addition, the switching-time control circuit 3 includes an on-duty detection circuit 4 and an ON-period control circuit 5.

In FIG. 2, the on-duty detection circuit 4 includes an inverter 41, switching elements SW3 and SW4, a reference voltage source 44 that outputs a predetermined reference voltage VRT, and a capacitor 43 having a capacitance Ci. In FIG. 2, the ON-period control circuit 5 includes a reference current source 51 to output a predetermined reference current Ic, a capacitor 52 having a capacitance Cc, a switching element SW5, and a comparator 53.

Referring back to FIG. 1, the first switching element SW1 is connected between the input terminal TI and the output terminal LX, and the second switching element SW2 is connected between the output terminal LX and a ground.

The output voltage from the output terminal LX is output to a load circuit 10 (e.g., CPU) via a high-frequency removal and smoothing low-pass filter 15. In other words, an electronic device 100 includes the switching regulator 1 and the low-pass filter 15 connected to the output terminal LX of the switching regulator 1. The low-pass filter 15 is constituted by an inductor 12 having an inductance L and an output capacitor 14 having a capacitance Cout. A resistor 13 that has a resistance Resr is a serial equivalent parasitic resistor to the output capacitor 14.

An output voltage VOUT from the low-pass filter 15 is input to the switching regulator 1 via the feedback terminal TF and then is divided by the dividing circuit 7. The dividing circuit 7 serves as a second dividing circuit. Then, a feedback voltage VF after dividing is proportional to the output voltage VOUT and is output to an inverting input terminal (−) of the comparator 6. A predetermined reference voltage VREF generated in a reference voltage source 11 is input to a non-inverting input terminal (+) of the comparator 6.

The comparator 6 compares the feedback voltage VF with the reference voltage VREF. Then, the comparator 6 outputs a low-leveled switching-time control signal CMPO to a set terminal S of the RS flip-flop circuit 22 when the feedback voltage VF is greater than the reference voltage VREF. The comparator 6 outputs a high-leveled switching-time control signal CMPO to the set terminal S of the RS flip-flop circuit 22 when the feedback voltage VF is smaller than the reference voltage VREF.

The high-leveled switching-time control signal CMPO serves as a second switching-time control signal. The second switching-time control signal CMPO from the comparator 6 indicates a finishing timing of an ON-period of the switching element SW2.

Herein, the comparator 6 includes a delay circuit, which controls the switching-time control signal CMPO so that, after the switching-time control signal CMPO becomes high, the switching-time control signal CMPO becomes low again after a delay time has elapsed since the feedback voltage VF has become higher than the reference voltage VREF again.

In addition, the switching-time control circuit 3 outputs a first switching-time control signal (high-leveled switching time control signal TON) indicating a finish timing of an ON-period of the switching element SW1 to a reset terminal R of the RS flip-flop circuit 22, which are described further detail later.

An output signal PSET from the RS flip-flop circuit 22 is output to the control-signal generation circuit 23 and the on-duty detection circuit 4. The control-signal generation circuit 23 generates a first switching element control signal PDRV to control on and off of the switching element SW1 for output to a gate of the switching element SW1 and a second switching-element control signal NDRV to control on and off of the switching element SW2 for output to a gate of the switching element SW2. The control-signal generation circuit 23 controls the switching elements SW1 and SW2 so that the ON-period of the switching element SW1 is finished when the output signal PSET falls and the ON-period of the switching element SW2 is finished when the output signal PSET rises, and the switching elements SW1 and SW2 are turned on complementarily. In addition, the control-signal generation circuit 23 generates an output signal TCHGB1 in synchronized with the (first) switching-element control signal PDRV for output to the switching-time control circuit 3.

In the present embodiment, the switching element SW1 is turned on in response to the low-leveled switching-element control signal PDRV and is turned off in response to the high-leveled switching-element control signal PDRV. On the contrary, the switching element SW2 is turned on in response to the high-leveled switching-element control signal NDRV and is turned off in response to the low-leveled switching-element control signal NDRV. In addition, the switching-element control signals PDRV and NDRV are generated so that the switching-element control signal NDRV causes the switching element SW2 to turn on when the switching element SW1 is turned off, and the switching-element control signal PDRV causes the switching element SW1 to turn on when the switching element SW2 is turned off.

In FIG. 1, when the feedback voltage VF becomes smaller than the reference voltage VREF, the comparator 6 causes the voltage level of the switching-time control signal CMPO to turn high. In response to this operation, the RS flip-flop circuit 22 is set, and the voltage level of the output signal PSET in the RS flip-flop circuit 22 becomes high. Then, the control-signal generation circuit 23 generates the low-leveled switching-element control signals PDRV and NDRV so that the switching element SW1 is turned on and the switching element SW2 is turned off (see FIG. 3). While the switching element SW1 is on state and the switching element SW2 is off state, energy is stored in the inductor 12 by the voltage difference between the input voltage VIN and the output voltage VOUT. Accordingly, as an inductance current in the inductor 12 is increased, the output voltage VOUT is increased by the output capacitor 14 and the serial parasitic resistor 13.

Then, when the voltage level of the switching-time control signal TON changes from low level to high level, in response to this operation, the RS flip-flop circuit 22 resets, and the voltage level of the output signal PSET from the RS flip-flop circuit 22 becomes low. Then, the control-signal generation circuit 23 generates the high-leveled switching-element control signals PDRV and NDRV so that the switching element SW1 is turned off and the switching element SW2 is turned on (see FIG. 3). While the switching element SW1 is off state and the switching element SW2 is on state, the energy in the inductor 12 is released by the voltage difference between a ground voltage and the output voltage VOUT. Accordingly, as the inductance current in the inductor 12 is decreased, the output voltage VOUT is decreased by the output capacitor 14 and the serial parasitic resistor 13.

With reference to FIG. 2, in the on-duty detection circuit 4, the third switching element SW3 is connected between the reference voltage source 44 and a junction node C1, and the switching element SW4 is connected between the junction node C1 and the ground. The integral resistor 42 having one terminal connected to the junction node C1, and the capacitor 43 is connected between the other terminal of the integral resistor 42 and the ground. A voltage at the junction node C1 that is a voltage across the capacitor 43 is output to an inverting input terminal (−) of the comparator 53 as a detection voltage Von1. Herein, the integral resistor 42 and the capacitor 43 constitute an integral circuit.

In the switching-element control circuit 2 shown in FIG. 2, the output signal PSET from the RS flip-flop circuit 22 is output to gates of the switching elements SW3 and SW4 via the inverter 41. In response to this output signal PSET, the switching element SW3 is turned on during the ON-period of the switching element SW1, in conjunction with the switching element SW1. On the other hand, the switching element SW4 is turned on during the ON-period of the switching element SW2, in conjunction with the switching element SW2.

In FIG. 2, when the switching element SW1 is on state and the switching element SW2 is off state, the voltage level of the output signal PSET from the RS flip-flop circuit 22 is high, and thus, the switching element SW3 is turned on and the switching element SW4 is turned off. Therefore, the reference voltage source 44 is connected to the integral resistor 42 via the switching element SW3, and the capacitor 43 is charged to the reference voltage VRT via the switching element SW3 and the integral resistor 42.

By contrast, when the switching element SW1 is off state and the switching element SW2 is off on, the voltage level of the output signal PSET from the RS flip-flop circuit 22 is low, and thus, the switching element SW3 is turned off and the switching element SW4 is turned on. Therefore, one terminal of the integral resistor 42 is connected to the ground via the switching element SW4, and the capacitor 43 is discharged to the ground voltage via the integral resistor 42 and the switching element SW4.

In FIG. 2, a period during which the switching element SW3 is on state and the switching element SW4 is off state, that is, a time period during which the switching element SW1 is on state, a charge Qchg charged in the capacitor 43 is calculated by the following formula 7, using a length of the ON-period "ton1" during which the switching element SW1 is on state, the reference voltage VRT, and a voltage V(t) (t: time) at a junction node between the integral resistor 42 and the capacitor 43.

$$Qchg = \int_0^{ton1} \frac{VRT - V(t)}{Ri} dt \quad (7)$$

In addition, a charge Qdchg charged in the capacitor 43 in a period during which the switching element SW3 is turned off and the switching element SW4 is turned off, that is, a period during which the switching element SW2 is turned on, is calculated by the following formula 8, using a length of the ON-period "ton2" during which the switching element SW2 is on state.

$$Qdchg = \int_0^{ton2} \frac{V(t)}{Ri} dt \quad (8)$$

At this time, the switching elements SW3 and SW4 repeat turning on and off, and after a time period Te (Te>>Ri×C1) (Ri: resistance of the integral resistor 42. Ci: capacitance of the capacitor 43) has elapsed, the voltage V (t) converges at a constant voltage Von1. Therefore, the voltage V(t) is approximated by the voltage Von (V(t)≈Von1), thereby deforming the formulas 7 and 8 as follows:

$$Qchg \approx ton1 \times \frac{VRT - Von1}{Ri} \quad (9)$$

$$Qdchg \approx ton2 \times \frac{Von1}{Ri} \quad (10)$$

In addition, after the time period Te (Te>>Ri×Ci) has further elapsed, the charge Qchg becomes equal to the charge Qdchg (Qchg=Qdchg), the output voltage Von1 from the on-duty detection circuit 4 is represented by the following formula 11, based on the formulas 9 and 10.

$$Von1 = \frac{ton1}{ton1 + ton2} \times VRT \quad (11)$$

That is, the on-duty detection circuit 4 generates the detection voltage Von1 proportional to an on-duty (ton1/(ton1+ton2)) of the switching element SW1 for output to the inverting input terminal (−) of the comparator 53.

In addition, in the ON-period control circuit 5, the reference current source 51 has one terminal connected to the input terminal TI, and the capacitor 42 is connected between the reference current source 51 and the ground. The switching element SW5 is connected in parallel to the capacitor 52. A voltage VC at a junction node between the reference current source 51 and the capacitor 52, that is, a voltage across the capacitor 52 is output to the non-inverting input terminal (+) of the comparator 53.

The output signal TCHGB1 in synchronized with the switching-element control signal PDRV from the switching-element control circuit 2 is output to a gate of the switching element SW5. Therefore, in response to the output signal TCHGB1, the switching element SW5 is turned off during the ON-period of the switching element SW1. On the contrary, the switching element SW5 is turned on during an OFF-period of the switching element SW1.

The comparator 53 compares the voltage VC with the detection voltage Von. The comparator 53 generates the high-leveled switching-time control signal TON (first switching-time control signal) when the voltage VC is greater than the detection voltage Von1 or generates a low-leveled switching-time control signal TON when the voltage VC is smaller than the detection voltage Von1.

Herein, the comparator 53 includes a delay circuit, which controls the switching-time control signal TON so that, after the switching-time control signal TON becomes high, the switching-time control signal TON becomes low again after a delay time has elapsed since the voltage VC has become lower than the detection voltage Von1 again.

In FIG. 2, in a period during which the switching element SW1 is on state in response to the low-leveled switching-element control signal PDRV, the switching element SW5 is turned off in response to the output signal TCHGB1 in synchronized with the switching-element control signal PDRV, and therefore, the capacitor 52 is charged at the reference current Ic. The comparator 53 compares the voltage VC across the charged capacitor 52 with the detection voltage Von1 from the on-duty detection circuit 4. The comparator 53 outputs the high-leveled switching-time control signal TON when the voltage VC is greater than the detection voltage Von1.

By contrast, in a period during which the switching element SW1 is off state and the switching element SW2 is on state, the switching element SW5 is turned on in response to the high-leveled output signal TCHGB1, and the all charge in the capacitor 52 is released. At this time, since a length of the period during which the switching element SW5 is off state corresponds to the length of the ON-period ton1 of the switching element SW1, the voltage VC is calculated as follows:

$$VC = Ic \times \frac{ton1}{Cc} \quad (12)$$

Accordingly, the following formula is obtained based on the formulas 11 and 12.

$$\frac{ton1}{ton1 + ton2} \times VRT = Ic \times \frac{ton1}{Cc} \quad (13)$$

Therefore, the following formula holds:

$$ton1 + ton2 = \frac{Cc}{Ic} \times VRT \quad (14)$$

Thus, a switching frequency fsw is obtained by the following formula.

$$fsw = \frac{1}{ton1 + ton2} \quad (15)$$
$$= \frac{Ic}{Cc \times VRT}$$

In the formula 15, the switching frequency fsw is a constant value determined by element values of respective elements constituting the on-duty detection circuit 4 and switching-period control circuit 3. Accordingly, the switching frequency fsw does not depend on any of the input voltage VIN, the output voltage VOUT, and an output current IOUT.

As described above, the switching regulator 1 converts the input voltage VIN input via the input terminal TI into a predetermined output voltage VOUT for output via the output terminal LX. The switching regulator 1 includes the input terminal TI, the output terminal LX, the first switching element SW1, the second switching element SW2, the switching-time control circuit 3, the first comparator 6, and the switching-element control circuit 2. The input voltage VIN is input to the input terminal TI, and the output voltage VOUT is output from the output terminal LX. The first switching element SW1 is connected between the input terminal TI and the output terminal LX. The second switching element SW2 is connected between the output terminal LX and a ground voltage. The switching-time control circuit 3 generates the first switching-time control signal (high-leveled switching time control signal TON) indicating finish timing of the ON-period of the first switching element SW1, based on a ratio of the length of the ON-period of the first switching element SW1 to a sum of the lengths of the ON-periods of the first switching element SW1 and the second switching element SW2. The first comparator 6 compares the feedback voltage VF corresponding to the output voltage VOUT with the predetermined first reference voltage VREF, and generates the second switching-time control signal (high-leveled switching-time control signal CMPO) indicating the finish timing of the ON-period of the second switching element SW2 when the feedback voltage VF is smaller than the reference voltage VREF. The switching-element control circuit 2 controls on/off switching of the first switching element SW1 and the second switching element SW2 so that the first switching element SW1 and the second switching element SW2 are turned on complementarily based on the first switching-time control signal (high-leveled switching-time control signal TON) and the second switching-time control signal (high-leveled switching-time control signal CMPO) and causes the time-averaged voltage VOUTa of the output voltage VOUT to keep constant.

In addition, the switching-time control circuit 3 includes the on-duty detection circuit 4 and the ON-period control circuit 5. The on-duty detection circuit 4 outputs the detection voltage Von1 indicating the ratio of the length of the ON-period of the first switching element SW1 to the sum of the lengths of the ON-periods of the first switching element SW1 and the second switching element SW2. The ON-period control circuit 5 generates the switching-time control signal TON based on the detection voltage Von1.

More specifically, the on-duty detection circuit 4 includes the reference voltage source 44, the third switching element SW3, the fourth switching element SW4, the integral resistive element 42, and the first capacitance element 43. The reference voltage source 44 generates the predetermined second reference voltage VRT. The third switching element SW3 has one terminal connected to the reference voltage source 44, controlled so that the third switching element SW3 is turned on and off in conjunction with the first switching element SW1. The fourth switching element SW4 has one terminal connected to the other terminal of the third switching element SW3, controlled so that the fourth switching element SW4 is turned on and off in conjunction with the second switching element SW2. The integral resistive element 42 has one terminal connected to the junction node C1 between the third switching element SW3 and the fourth switching element SW4. The first capacitance element 43 is connected between the other terminal of the integral resistive element 42 and the ground. The first capacitance element 43 is charged to the second predetermined reference voltage VRT by connecting the reference voltage source 44 via the integrated resistive element 42 when the third switching element SW3 is on state and is discharged to a ground voltage by connecting the ground via the integrated resistive element 42 when the fourth switching element SW4 is on state. The on-duty detection circuit 4 outputs the voltage across the first capacitance element 43 as the detection voltage Von1.

The ON-period control circuit 5 includes the reference current source 51, the fifth switching element SW5, the second capacitive element 52, and the second comparator 53. The reference current source 51 outputs the predetermined reference current Ic. The fifth switching element SW5 is controlled so that the fifth switching element SW5 is turned off while the first switching element SW1 is on state and is turned off while the first switching element SW1 is off state. The second capacitive element 52 is connected between the reference current source 51 and the ground and is connected in parallel to the fifth switching element SW5. The second capacitance element 52 is charged at the predetermined reference current Ic by connecting the reference current source 51 when the fifth switching element SW5 is off state and is discharged to the ground voltage by connecting to the ground when the fifth switching element SW5 is on state. The second comparator 53 compares the detection voltage Von from the on-duty detection circuit 4 with the voltage VC across the second capacitive element 52 and outputs the first switching-time control signal (high-leveled first switching-time control signal TON) when the voltage VC is greater than the detection voltage Von.

FIG. 3 is a timing chart illustrating the operation in the switching regulator 1 when the output current IOUT is increased from a first current I1 to a second current I2 (I1<I2) (I1>I2). As the output current IOUT is increased from the first current I1 to the second current I2, the ratio of the length of the ON-period ton1 to the length of the ON-period ton2 is changed. However, the length of the ON-period ton1 is increased as the detection voltage Von is increased according to the formula 11. Therefore, a switching frequency fsw1 when the output current IOUT is the first current I1 becomes equivalent to the switching frequency fsw2 when the output current IOUT is the second current I2.

In addition, in FIG. 3, even though the output current IOUT is increased from the first current I1 to the second current I2, a time-averaged voltage VOUTa of the output voltage VOUT is not changed. As is clear in the formula 13, even though the input voltage VIN and the output voltage VOUT are changed, the switching frequency fsw and the time-averaged voltage VOUTa of the output voltage Vout are not changed.

As described above, in the present embodiment, without increasing the chip size and consumption of the current, the switching frequency fsw and the time-averaged voltage VOUTa of the output voltage VOUT can be kept constant, and accordingly, the switching regulator 1 can supply a voltage with a high degree of accuracy to the load circuit 10.
<Variation 1>

Figure 4:
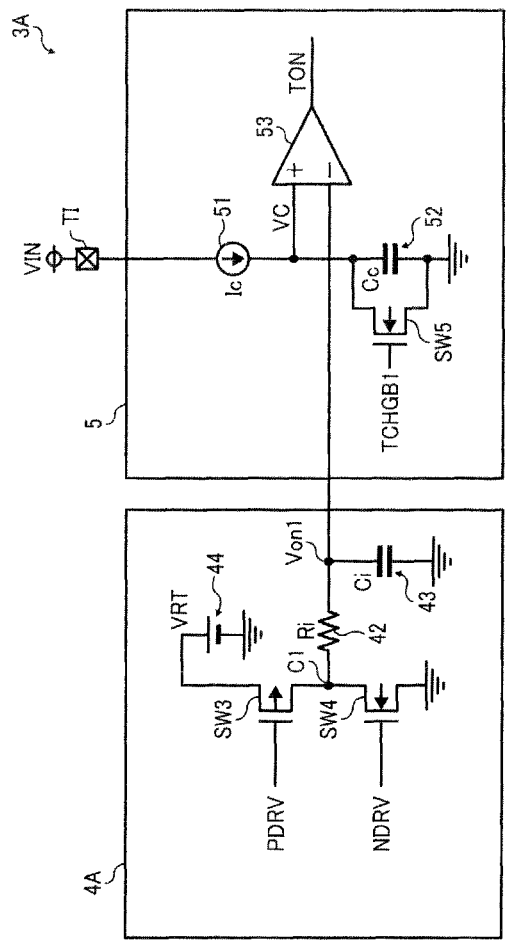
FIG. 4 is circuit diagram illustrating a switching-time control circuit according to a variation of the first embodiment shown in FIG. 2.

FIG. 4 is circuit diagram illustrating a switching-time control circuit 3A according to a variation of the first embodiment shown in FIG. 2. In FIG. 4, compared to the switching-time control circuit 3 according to the first embodiment, the switching-time control circuit 3A includes an on-duty detection circuit 4A instead of the on-duty detection circuit 4. In the on-duty detection circuit 4A, the switching-element control signal NDRV is directly input to a gate of the switching element SW3, and the switching-element control signal PDRV is directly input to the gate of the switching element SW4.

Accordingly, in FIG. 4, similarly to the above-described configuration, the switching element SW3 is turned on and off in conjunction with the switching element SW1, and the switching element SW4 is turned on and off in conjunction with the switching element SW2. Thus, the on-duty detection circuit 4A generates and outputs the detection voltage Von1, similarly to the first embodiment.
<Variation 2>

Further, in the first embodiment, the switching-element control signal PDRV and NDRV cause the switching element SW2 to turn on when the switching element SW1 is turned off and the switching element SW1 to turn on when the switching element SW2 is turned off.

However, the present disclosure is not limited to this variation for the switching-element control signals PDRV and NDRV control the switching elements SW1 and SW2 as follows. After the ON-period of the switching element SW1 is finished, the switching element SW2 is turned on after the switching elements SW1 and SW2 are off state for a predetermined time. Then, after the ON-period of the switching element SW2 is finished, the switching element SW1 and SW2 are off state for a predetermined period. In other words, the switching element SW1 is turned on after a short interval from the finishing time of the ON-period of the switching element SW2, and the switching element SW2 is turned on after a short interval from the finishing time of the ON-period of the switching element SW1. In this variation, similarly to the first embodiment, the switching elements SW3 and SW4 are controlled so that the switching element SW3 is turned on in a period during which the switching element SWt is on state and the switching element SW4 is turned on in a period during which the switching element SW2 is on state. In this case, similarly to above-described configuration, the switching-time control circuit according to the present variation generates the detection voltage Von1.

Second Embodiment

Figure 5:
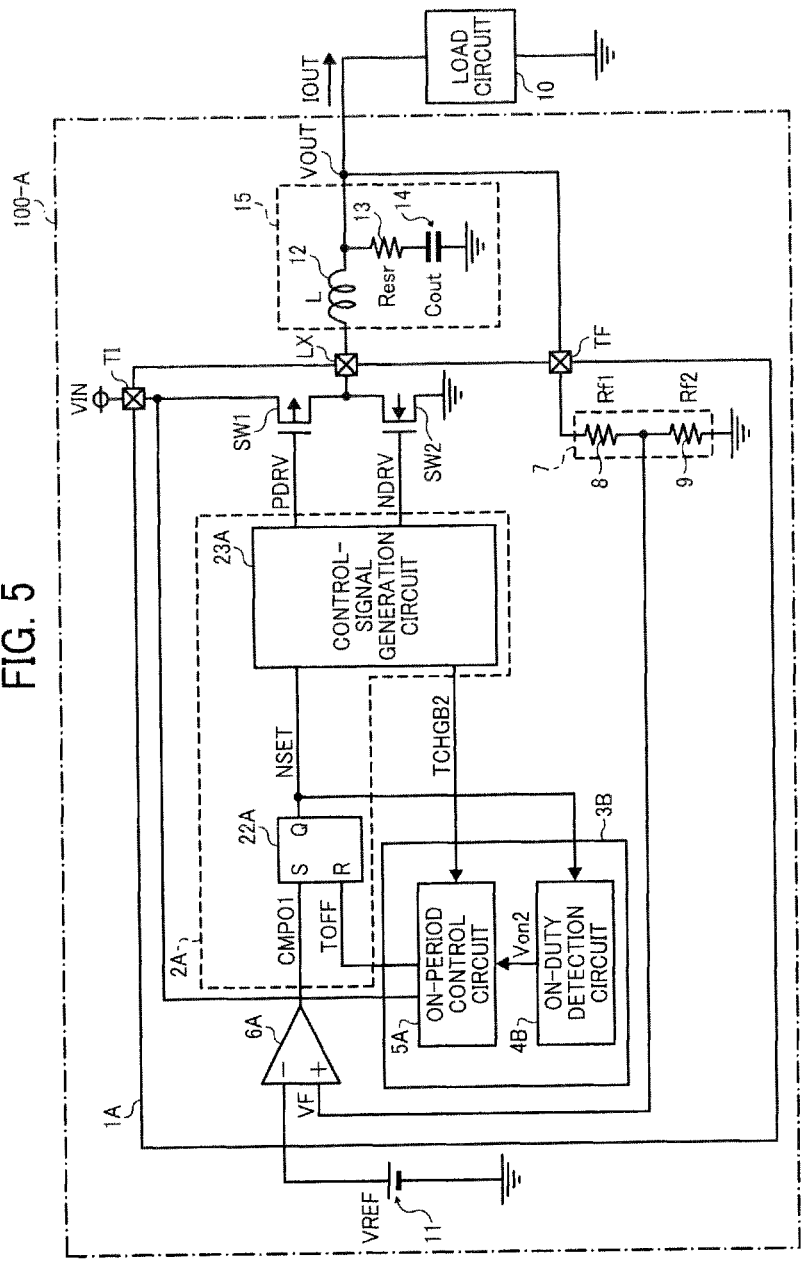
FIG. 5 is a circuit diagram illustrating configuration of a switching regulator according to a second embodiment.
Figure 6:
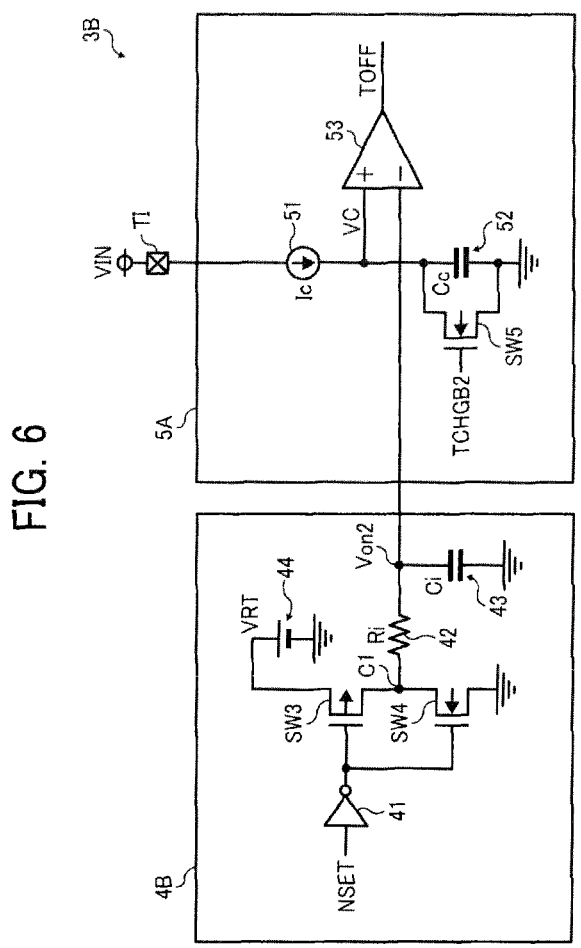
FIG. 6 is a circuit diagram illustrating a configuration of a switching-time control circuit in the switching regulator shown in FIG. 5.
Figure 7:
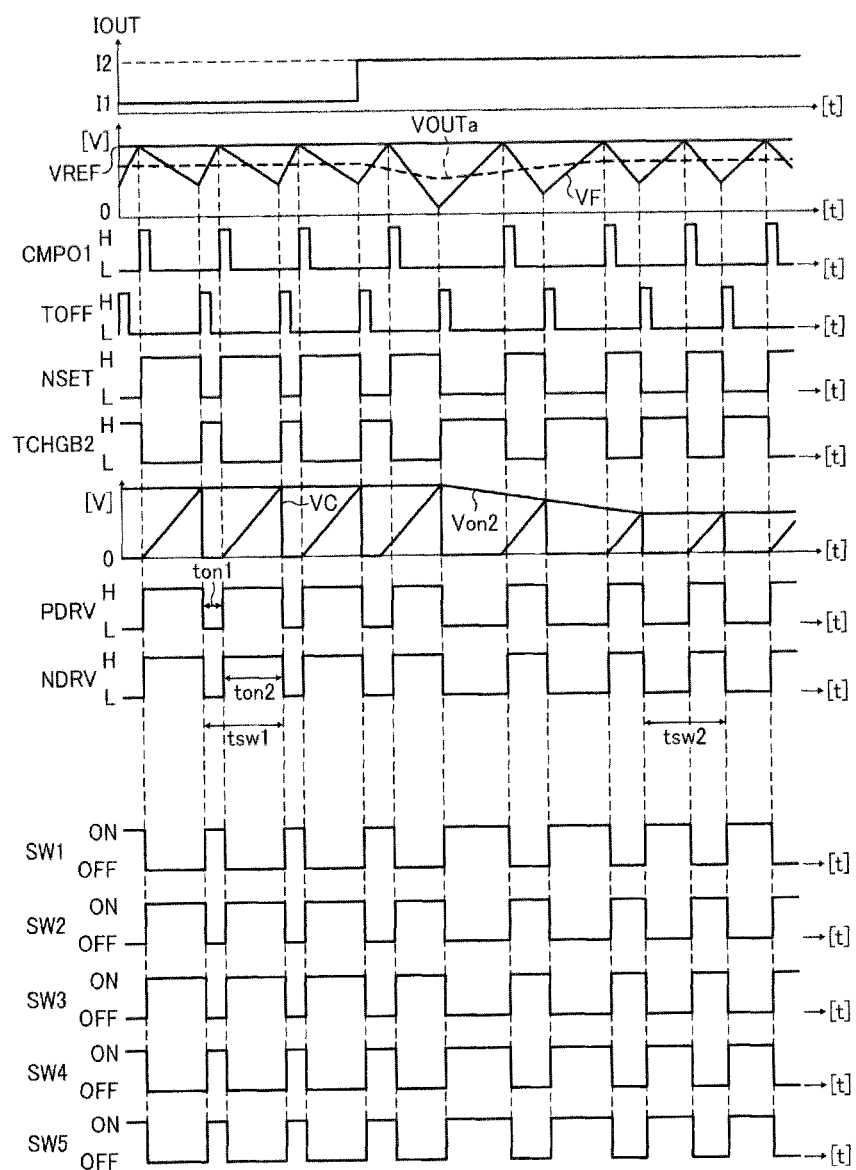
FIG. 7 is a timing chart illustrating the operation of the switching regulator shown in FIG. 5.

FIG. 5 is a circuit diagram illustrating configuration of a switching regulator 1A according to a second embodiment. The switching regulator 1A may be employed in an electronic device 100-A. FIG. 6 is a circuit diagram illustrating a configuration of a switching-time control circuit 3B in the switching regulator 1A shown in FIG. 5. FIG. 7 is a timing chart illustrating the operation of the switching regulator 1A shown in FIG. 5.

Compared to the switching regulator 1 shown in FIG. 1, the switching regulator 1A includes a switching-element control circuit 2A instead of the switching-element control circuit 2, the switching-time control circuit 3B instead of the switching-time control circuit 3, and a comparator 6A instead of the comparator 6.

A difference point in the second embodiment from the first embodiment is described below. In FIG. 5, the switching-element control circuit 2A includes a RS flip-flop circuit 22A and a control-signal generation circuit 23A. Herein, the feedback voltage VF is output to a non-inverting input terminal (+) of the comparator 6A. The predetermined reference voltage VREF generated in the reference voltage source 11 is input to an inverting input terminal (+) of the comparator 6A. The comparator 6A compares the feedback voltage VF with the reference voltage VREF. Then, the comparator 6A outputs a high-leveled switching-time control signal CMPO1 to a set terminal S of the RS flip-flop circuit 22A when the feedback voltage VF is greater than the reference voltage VREF. The comparator 6A outputs a low-leveled switching-time control signal CMPO1 to the set terminal S of the RS flip-flop circuit 22 when the feedback voltage VF is smaller than the reference voltage VREF.

Herein, the high-leveled switching-time control signal CMPO1 (first switching time control signal) from the comparator 6A indicates the finishing timing of an ON-period of the switching element SW1. The comparator 6A includes a delay circuit, which controls the switching-time control signal CMPO1 so that, after the switching-time control signal CMPO1 becomes high, the switching-time control signal CMPO1 becomes low again after a delay time has elapsed since the feedback voltage VF has become higher than the reference voltage VREF again.

With reference to FIG. 6, the switching-time control circuit 3A outputs a second switching-time control signal (a high-leveled switching-time control signal TOFF) indicating the finish timing of an ON-period of the switching element SW2 to a reset terminal R of the RS flip-flop circuit 22A. An output signal NSET from the RS flip-flop circuit 22A is output to the control-signal generation circuit 23A and an on-duty detection circuit 4B. The control-signal generation circuit 23A generates a first switching-element control signal PDRV to control on and off of the switching element SW1 for output to a gate of the switching element SW1 and a second switching-element control signal NDRV to control on and off of the switching element SW2 for output to a gate of the switching element SW2. The control-signal generation circuit 23A controls the switching elements SW1 and SW2 so that the ON-period of the switching element SW2 is finished when the output signal NSET falls and the ON-period of the switching element SW1 is finished when the output signal NSET rises. Thus, the switching elements SW1 and SW2 are turned on complementarily. In addition, the control-signal generation circuit 23A generates an output signal TCHGB2 that is an inverted signal of the (second) switching-element control signal NDRV.

In FIG. 5, when the voltage level of the switching-time control signal TOFF is changed from low to high, in response to this operation, the RS flip-flop circuit 22A is reset, and the voltage level of the output signal NSET from the RS flip-flop circuit 22A becomes low. Then, the control-signal generation circuit 23A generates the switching-element control signals PDRV and NDRV to cause the switching element SW1 to turn on and the switching element SW2 to turn off. While the switching element SW1 is on state and the switching element SW2 is off state, the energy is stored in the inductor 12 by the voltage difference between the input voltage VIN and the output voltage VOUT. Accordingly, as the inductance current in the inductor 12 is increased, the output voltage VOUT is increased by the output capacitor 14 and the serial equivalent parasitic resistor 13.

Subsequently, when the feedback voltage VF becomes greater than the reference voltage VREF, the comparator 6A causes the voltage level of the switching-time control signal CMPO1 to high. In response to this operation, the RS flip-flop circuit 22A is set, and the voltage level of the output signal NSET from the RS flip-flop circuit 22A becomes high. Then, the control-signal generation circuit 23A generates the switching-element control signals PDRV and NDRV so that the switching element SW1 is turned off and the switching element SW2 is turned on. While the switching element SW1 is off state and the switching element SW2 is on state, the energy in the inductor 12 is discharged to the voltage difference between the ground voltage and the output voltage VOUT. Accordingly, as the inductor current in the inductor 12 is decreased, the output voltage VOUT is decreased by the output capacitor 14 and the serial equivalent parasitic resistor 13.

In FIG. 6, the switching-time control circuit 3A includes the on-duty detection circuit 4B and an ON-period control circuit 5A. Compared to the on-duty detection circuit 4 according to the first embodiment, the different point is that the on-duty detection circuit 4B receives the output signal NSET from the RS flip-flop circuit 22A instead of the output signal PSET from the RS flip-flop circuit 22. Accordingly, in the present embodiment, the switching element SW3 is turned on when the switching element SW2 is on state, and the switching element SW4 is turned on when the switching element SW1 is on state. Therefore, the detection voltage Von2 as a voltage across the capacitor 43 is obtained by formula 16.

$$Von2 = \frac{ton2}{ton1 + ton2} \times VRT \qquad (16)$$

That is, the on-duty detection circuit 4B generates the detection voltage Von2 proportional to an on-duty (ton2/(ton1+ton2)) of the switching element SW2, for output to the inverting input terminal (−) of the comparator 53.

In FIG. 6, the switching-time control circuit 3A is configured similar to the switching-time control circuit 3. However, the output signal TCHGB2 that is the inverted signal of the control signal NDRV is output to a gate of the switching element SW5. Therefore, in response to the output signal TCHGB2, the switching element SW5 is turned off during the ON-period of the switching element SW2, and the switching element SW5 is turned off during the OFF-period of the switching element SW2.

In addition, the comparator 53 compares the voltage VC with the detection voltage Von2. The comparator 53 outputs a high-leveled switching-time control signal TOFF (second switching-time control signal) when the voltage VC is greater than the detection voltage Von2, and outputs a low-leveled switching-time control signal TOFF when the voltage VC is smaller than the detection voltage Von2. Herein, the comparator 53 includes a delay circuit, which controls the switching-time control signal TOFF so that, after the switching-time control signal TOFF becomes high, the switching-time control signal TOFF becomes low again after a delay time has elapsed since the voltage VC has become lower than the detection voltage Von1 again.

In FIG. 6, while the switching element SW2 is off in response to the high-leveled switching-element control signal NDRV, the switching element SW5 is turned off in response to the low-leveled output signal TCHGB2, and the capacitor 52 is charged at the reference current Ic.

The comparator 53 compares the voltage VC across the charged capacitor 52 with the detection voltage Von2. The comparator 53 outputs the high-leveled switching-time control signal TOFF when the voltage VC becomes greater than the detection voltage Von2.

By contrast, while the switching element SW2 is off state and the switching element SW1 is on state, the switching element SW5 is turned on in response to the high-leveled output signal TCHGB, and the charge in the capacitor 52 is all discharged.

At this time, a length of a period during which the switching element SW5 is off corresponds to the length of the ON-period "ton2" of the switching element SW2, the voltage VC is obtained as follows.

$$(\mathcal{7}) VC = IC \times \frac{\text{ton2}}{Cc} \quad (17)$$

Accordingly, the following formula 18 is obtained based on the formulas 16 and 17.

$$(\mathcal{7}) \frac{\text{ton2}}{\text{ton1} + \text{ton2}} \times VRT = Ic \times \frac{\text{ton2}}{Cc} \quad (18)$$

Therefore, the following formula 19 holds:

$$(\mathcal{7}) \text{ton1} + \text{ton2} = \frac{Cc}{Ic} \times VRT \quad (19)$$

Thus, a switching frequency fsw is obtained by the following formula.

$$(\mathcal{7}) fsw = \frac{1}{\text{ton1} + \text{ton2}} \quad (20)$$
$$= \frac{Ic}{Cc \times VRT}$$

In the formula 20, the switching frequency fsw is a constant value determined by element values of respective elements constituting the on-duty detection circuit 4B and the ON-period control circuit 5A. Accordingly, the switching frequency fsw is does not depend on any of the input voltage VIN, the output voltage VOUT, and the output current IOUT.

As described above, the switching regulator 1A converts an input voltage VIN into a predetermined output voltage VOUT. The switching regulator 1A includes the input terminal TI, the output terminal LX, the first switching element SW1, the second switching element SW2, the first comparator 6A, the switching-time control circuit 3B, and the switching-element control circuit 2A. The input voltage VIN is input to the input terminal TI. The output voltage is output from the output terminal LX. The first switching element SW1 is connected between the input terminal TI and the output terminal LX. The second switching element SW2 is connected between the output terminal LX and a ground. The first comparator 6A compares the feedback voltage VF corresponding to the output voltage VOUT with the predetermined first reference voltage VREF, and generates the first switching-time control signal (high-leveled switching-time control signal CMPO1) indicating the finish timing of the ON-period of the first switching element SW1, when the feedback voltage VF is smaller than the reference voltage VREF. The switching-time control circuit 3B generates a second switching-time control signal (high-leveled switching-time control signal TOFF) indicating finish timing of the ON-period of the second switching element SW2, based on the ratio of the length of the ON-period of the second switching element SW2 to a sum of the lengths of the ON-periods of the first switching element SW1 and the second switching element SW2. The switching-element control circuit 2A controls on/off operation of the first switching element SW1 and the second switching element SW2 so that the first switching element SW1 and the second switching element SW2 are turned on complementarily based on the first switching-time control signal (high-leveled switching-time control signal CMPO1) and the second switching-time control signal (high-leveled switching-time control signal TOFF).

In addition, the switching period control circuit 3B includes the on-duty detection circuit 4B and the ON-period control circuit 5A. The on-duty detection circuit 4B outputs the detection voltage Von2 indicating the ratio of the length of the ON-period of the second switching element SW2 to the sum of the lengths of the ON-periods of the first switching element SW1 and the second switching element SW2. The ON-period control circuit 5A generates the second switching-time control signal (high-leveled switching-time control signal TOFF) based on the detection voltage Von2.

More specifically, the on-duty detection circuit 4B includes the reference voltage source 44, the third switching element SW3, the fourth switching element SW4, the integral resistive element 42, and the first capacitance element 43. The reference voltage source 44 generates the predetermined second reference voltage VRT. The third switching element SW3 has one terminal connected to the reference voltage source 44, controlled so that the third switching element SW3 is turned on and off in conjunction with the second switching element SW2. The fourth switching element SW4 has one terminal connected to the other terminal of the third switching element SW3, controlled so that the fourth switching element SW4 is turned on and off in conjunction with the first switching element SW1. The integral resistive element 42 has one terminal connected to the junction node Ci between the third switching element SW3 and the ground. The first capacitance element 43 is connected between the other terminal of the integral resistive element 42 and the fourth switching element SW4. The first capacitance element 43 is charged to the predetermined second reference voltage VRT by connecting the reference voltage source 44 via the integrated resistive element 42 when the third switching element SW3 is on state, and is discharged to the ground voltage by connecting the ground via the integrated resistive element 43 when the fourth switching element SW4 is on state. The on-duty detection circuit 4B outputs the voltage across the first capacitance element 43 as the detection voltage Von2.

In addition, the ON-period control circuit 5A includes the reference current source 51, the fifth switching element SW5, the second capacitive element 52, and the second comparator 53. The reference current source 51 outputs the predetermined reference current Ic. The fifth switching element SW5 is controlled so that the fifth switching element SW5 is turned off while the second switching element SW2 is on state and is turned off while the second switching element SW2 is off state. The second capacitive element 52 is connected between the reference current source 51 and the ground and is connected in parallel to the fifth switching element SW5. The second capacitance element 52 is charged at the reference current by connecting the reference current source 51 when the fifth switching element SW5 is off state, and being discharged to the ground voltage by connecting the ground when the fifth switching element SW5 is on state. The second comparator 53 compares the detection voltage Von from the on-duty detection circuit 4B with the voltage VC across the second capacitive element 52, and outputs the second switching-time control signal (high-leveled switching time control signal TOFF) when the voltage VC across the second capacitive element 52 is greater than the detection voltage Von2.

FIG. 7 is a timing chart illustrating the operation of the switching regulator 1A when the output current IOUT is changed from the first current I1 to the second current I2 (I1<I2). When the output current IOUT is increased from the first current I1 to the second current I2, the ratio of the length of the ON-period ton1 to the length of the ON-period ton2 is changed. However, as the detection voltage Von2 is decreased, the length of the ON-period ton1 is decreased according to the formula 16, the switching frequency fsw1 when the output current IOUT is the first current I1 becomes equivalent to the switching frequency fsw2 when the output current IOUT is the second current I2. With reference to FIG. 7, even when the output current IOUT is changed from the first current I1 to the second current I2, the time-averaged voltage VOUTa of the output voltage VOUT is not changed.

As is clear in the formula 20, even when the input voltage VIN and the output current IOUT are changed, the switching frequency fsw and the time-averaged voltage VOUTa of the output voltage VOUT is not changed.

As described above, in the present embodiment, without increasing the chip size and consumption of the current, the switching frequency fsw and the time-averaged voltage VOUTa of the output voltage VOUT can be kept constant, thereby the switching regulator 1A can supply a voltage with a high degree of accuracy to the load circuit 10.

<Variation 1>

Figure 8:
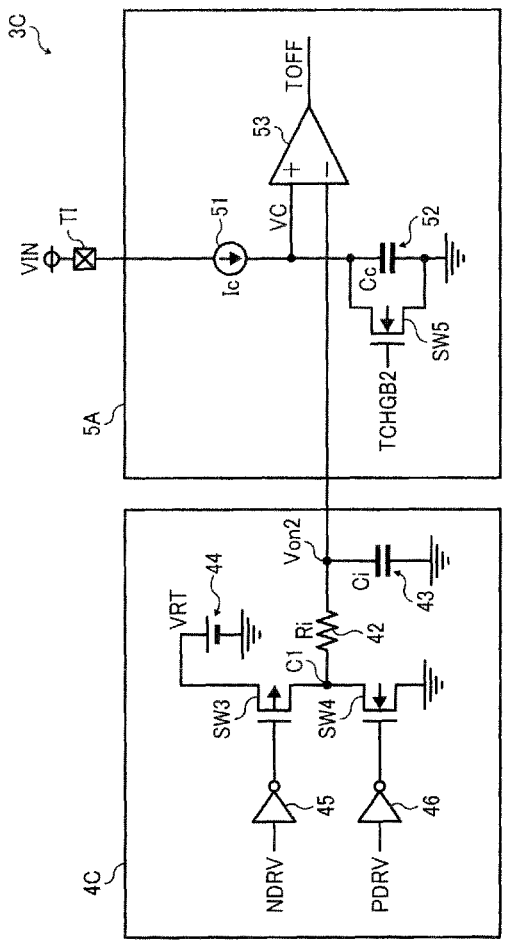
FIG. 8 is a circuit diagram illustrating a configuration of a switching-time control circuit according to a variation of the second embodiment shown in FIG. 6.

FIG. 8 is a circuit diagram illustrating a configuration of a switching-time control circuit 3C according to a variation of the second embodiment. In FIG. 8, the switching-time control circuit 3C includes an on-duty detection circuit 4C instead of the on-duty detection circuit 4B in the switching-time control circuit 3B according to the second embodiment. In addition, compared to the on-duty detection circuit 4B, the on-duty detection circuit 4C further includes an inverter 45 that inverts the switching-element control signal NDRV for output to a gate of the switching element SW3 and an inverter 46 that inverts the switching-element control signal NDRV for output to a gate of the switching element SW4. Accordingly, in FIG. 8, similarly to the second embodiment, the switching element SW3 is turned on and off in conjunction with the switching element SW2, and the switching element SW4 is turned on and off in conjunction with the switching element SW1. Thus, the on-duty detection circuit 4C generates the detection voltage Von2.

<Variation 2>

Further, in the first embodiment, the switching-element control signals PDRV and NDRV so that the switching element SW2 is turned on when the switching element SW1 is turned off the switching element SW1 is turned on when the switching element SW2 is turned off. However, the present disclosure is not limited to this variation for the switching-element control signals PDRV and NDRV control the switching elements SW1 and SW2 as follows. After an ON-period of the switching element SW1 is finished, the switching element SW2 is turned on after the switching elements SW1 and SW2 are off state for a predetermined time. Then, after an ON-period of the switching element SW2 is finished, the switching element SW1 and SW2 are off state for a predetermined period. In other words, the switching element SW1 is turned on after a short interval from the finishing time of the ON-period of the switching element SW2, and the switching element SW2 is turned on after a short interval from the finishing time of the ON-period of the switching element SW1. In this variation, the switching elements SW3 and SW4 are controlled so that the switching element SW3 is turned on in a period during which the switching element SW2 is on state and the switching element SW4 is turned on in a period during which the switching element SW1 is on state. In this case, similarly to above-described second embodiment, the switching-time control circuit according to the present variation generates the detection voltage Von2.

Third Embodiment

Figure 9:
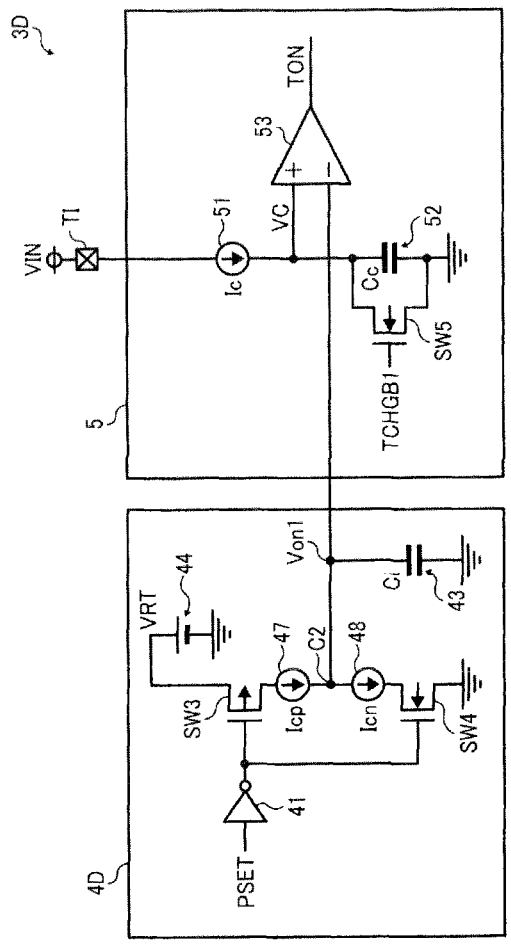
FIG. 9 is a circuit diagram illustrating a switching-time control circuit according to a third embodiment.

FIG. 9 is a circuit diagram illustrating a switching-time control circuit 3D according to a third embodiment. The switching-time control circuit 3D according to the present embodiment includes an on-duty detection circuit 4D instead of the on-duty detection circuit 4 in the switching-time control circuit 3 according to the first embodiment.

In FIG. 9, the on-duty detection circuit 4D includes an inverter 41, the switching elements SW3 and SW4, the reference voltage source 44 to generate the predetermined second reference voltage VRT, a charge-reference current source 47 to generate a predetermined charge current Icp, a discharge-reference current source 48 to output a predetermined discharge current Icn, and the first capacitance element 43 having the capacitance Ci. The switching element SW3, the charge-reference current source 47, the discharge-reference current source 48, and the switching element SW4 are connected in serial between the reference voltage source 44 and the ground. A junction node C2 between the reference current sources 47 and 48 is connected to the ground via the capacitor 43. The voltage across the capacitor 43 is output to the inverting input terminal (−) of the comparator 53 as the detection voltage Von1. In FIG. 9, similarly to the first embodiment, the output signal PSET from the RS flip-flop circuit 22 is output to gates of the switching elements SW3 and SW4 via the inverter 41. In response to the output signal PSET, the switching element SW3 is turned on in a period during which the switching element SW1 is on state, in conjunction with the switching element SW1. On the other hand, the switching element SW4 is turned on in a period during which the switching element SW2 is on state, in conjunction with the switching element SW2.

In FIG. 9, when the switching element SW1 is on state and the switching element SW2 is off state, the voltage level of the output signal PSET from the RS flip-flop circuit 22 is high level. Accordingly, the switching element SW3 is turned on and the switching element SW4 is turned off. Therefore, the reference voltage source 44 is connected to the charge-reference current source 47, and the capacitor 43 is charged at the charging current Icp.

By contrast, when the switching element SW1 is off state and the switching element SW2 is on state, the voltage level of the output signal PSET from the RS flip-flop circuit 22 is low level. Accordingly, the switching element SW3 is turned off and the switching element SW4 is turned off. Therefore, the one terminal of the capacitor 43 is connected to the ground via the discharge-reference current source 48 and the switching element SW4, and the capacitor 43 is discharged to the ground voltage at the discharge current Icn.

By repeating the switching elements SW1 and SW2 on and off, and elapsing the time period Te (Te>>Ri×Ci), similarly to the first embodiment, the detection voltage Von 1 proportional to the on-duty of the switching element SW1 (ton1/(ton1+ton2)) is generated (see formula 11).

As described above, the on-duty detection circuit 4D includes the reference voltage source 44, the third switching element SW3, the charge-reference current source 47, the fourth switching element SW4, the discharge-reference current source 48, and the first capacitance element 43. The reference voltage source 44 generates the predetermined second reference voltage VRT. The third switching element SW3 has one terminal connected to the reference voltage source 44, controlled so that the third switching element SW3 is turned on and off in conjunction with the first switching element SW1. The charge-reference current source 47, connected to the other terminal of the third switching element SW3, generates the predetermined charge current Icp. The fourth switching element SW4 has one terminal connected to the ground, controlled so that the fourth switching element SW4 is turned on and off in conjunction with the second switching element SW2. The discharge-reference current source 48, connected between the other terminal of the fourth switching element SW4 and the charge-reference current source 47, outputs the predetermined discharge current Icn. The first capacitance element 43 is connected between the ground and the junction node C2 between the charge-reference current source 47 and the discharge-reference current source 48. The first capacitive element 43 is charged at the predetermined charge current Icp by connecting the reference voltage source 44 via the charge-reference current source 47 when the third switching element SW3 is turned on in conjunction with the first switching element SW1. The first capacitive element 43 is discharged at the predetermined discharge current Icn by connecting the ground via the discharge-reference current source 48 when the fourth switching element SW4 is turned on in conjunction with the second switching element SW2. The on-duty detection circuit 4D outputs the voltage across the first capacitance element 43 as the detection voltage Von1.

In general, switching regulators include a reference current source to drive the circuit therein, and therefore, this reference current source can be used as the charge-reference current source 47 and the discharge-reference current source 48 in the present embodiment. Therefore, circuit area of the on-duty detection circuit 4D in the present embodiment can be further smaller than that of the on-duty detection circuit 4.

In addition, the charging current Icp when the switching element SW3 is on state and the discharge current Icn when the switching element SW4 is on state are set separately, the level of the detection voltage Von1 can be set at arbitral. Therefore, as the level of the detection voltage Von1 is set smaller, the input voltage of the comparator 53 becomes smaller. Thus, the comparator 53 in the present embodiment can become smaller circuit area and set lower consumption current.

It is to be noted that, similarly to the present embodiment, in the on-duty detection circuits 4A, 4B, 4C, and 4E, the integral resistor 42 may be eliminated, the charge-reference current source 47 may be connected between the switching element SW3 and the junction node C1, and the discharge-reference current source 48 may be connected between the junction node C1 and the switching element SW4.

More particularly, when the configuration of the third embodiment is adopted in the on-duty detection circuits 4B according to the second embodiment, the internal configuration is described below. The on-duty detection circuit 4C adopted in the second embodiment includes the reference voltage source 44, the third switching element SW3 in conjunction with the first switching element SW1, a charge-reference current source 47, a fourth switching element SW4, a discharge-reference current source 48, and a first capacitance element 42. A difference point in the second embodiment from the first embodiment is that the third switching element SW3 is controlled so that the third switching element SW3 is turned on and off in conjunction with the second switching element SW2, and the fourth switching element SW4 is controlled so that the fourth switching element SW4 is turned on and off in conjunction with the first switching element SW1. Therefore, the first capacitive element 53 is charged at the predetermined charge current Icp by connecting the reference voltage source 44 via the charge-reference current source 47 when the third switching element SW3 is turned on in conjunction with the second switching element SW2. The first capacitive element 53 is discharged at the predetermined discharge current Icn by connecting the ground via the discharge-reference current source 48 when the fourth switching element SW4 is turned on in conjunction with the first switching element SW1.

Fourth Embodiment

Figure 10:
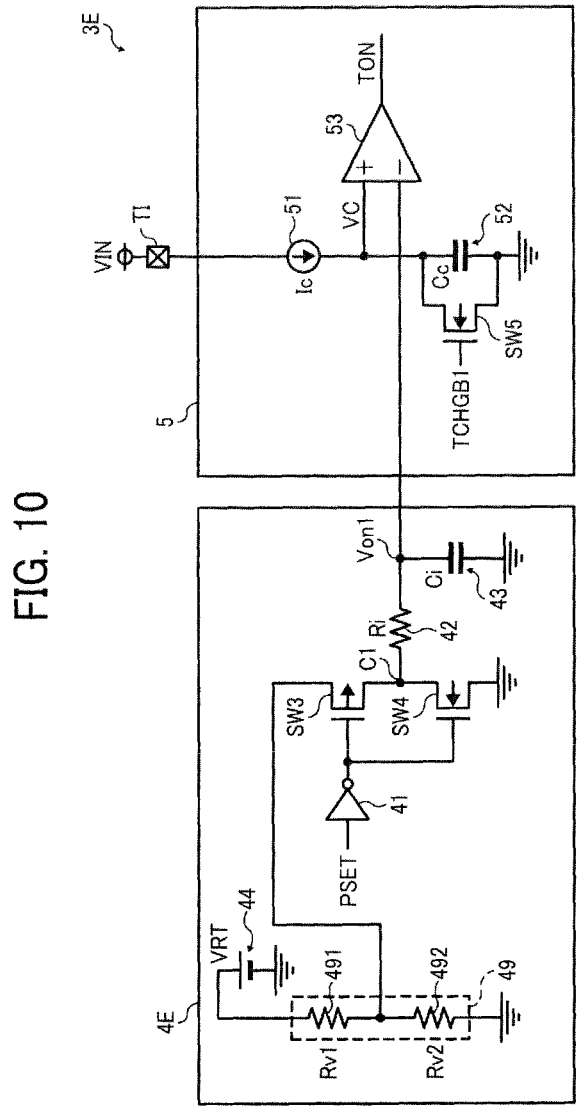
FIG. 10 is a circuit diagram illustrating a switching-time control circuit according to a fourth embodiment.
Figure 11:
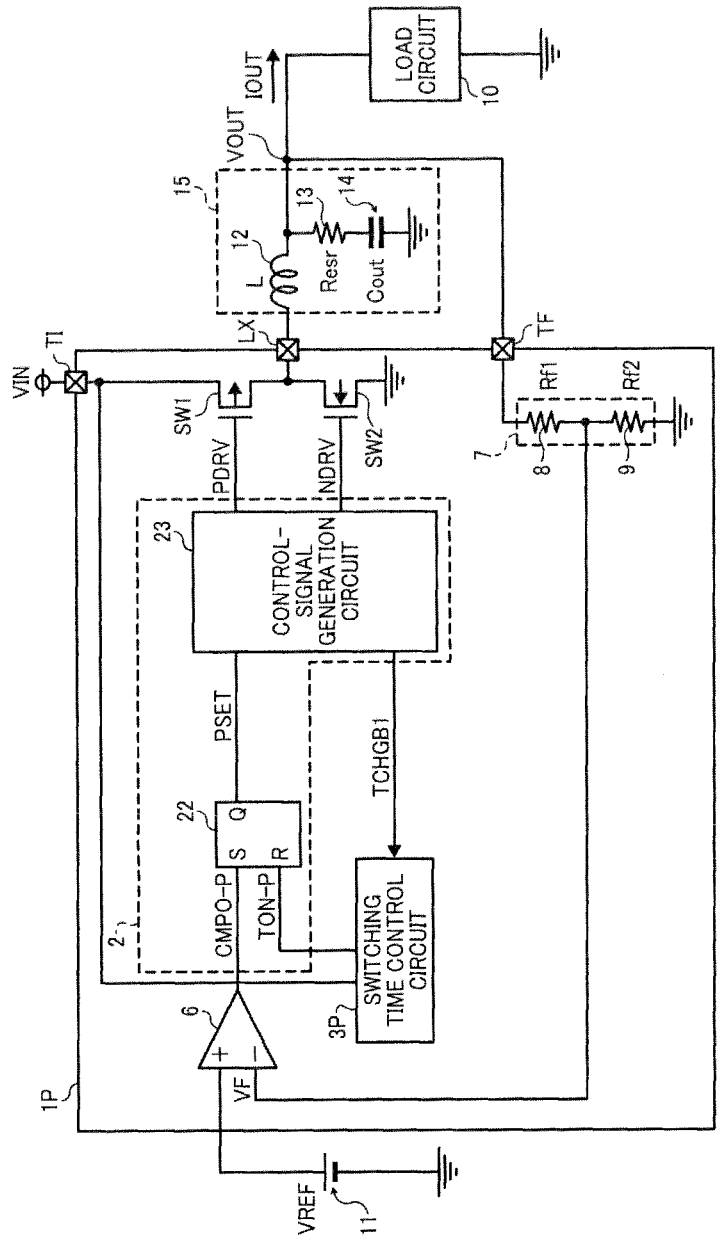
FIG. 11 is a circuit diagram illustrating a conventional switching regulator.
Figure 12:
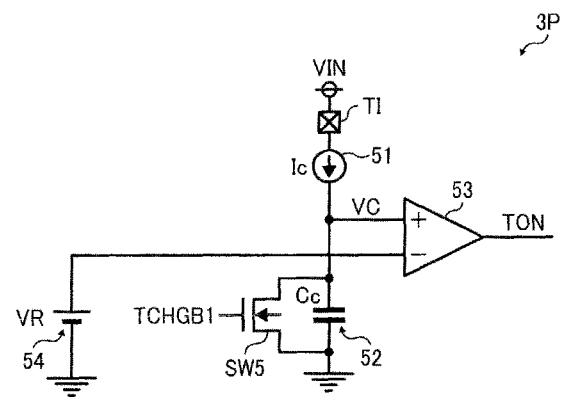
FIG. 12 is a circuit diagram illustrating a switching-time control circuit in the switching regulator shown in FIG. 11.
Figure 13:
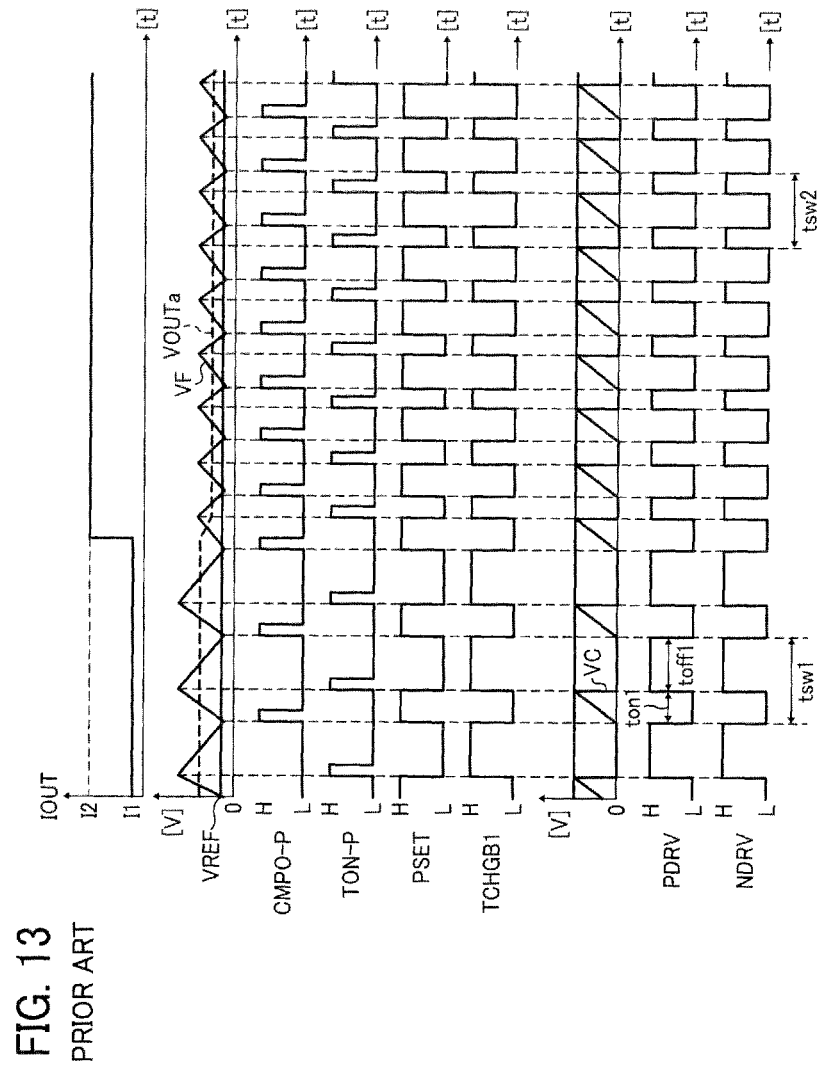
FIG. 13 is a timing chart illustrating operation in the switching regulator shown in FIG. 11.
Figure 14:
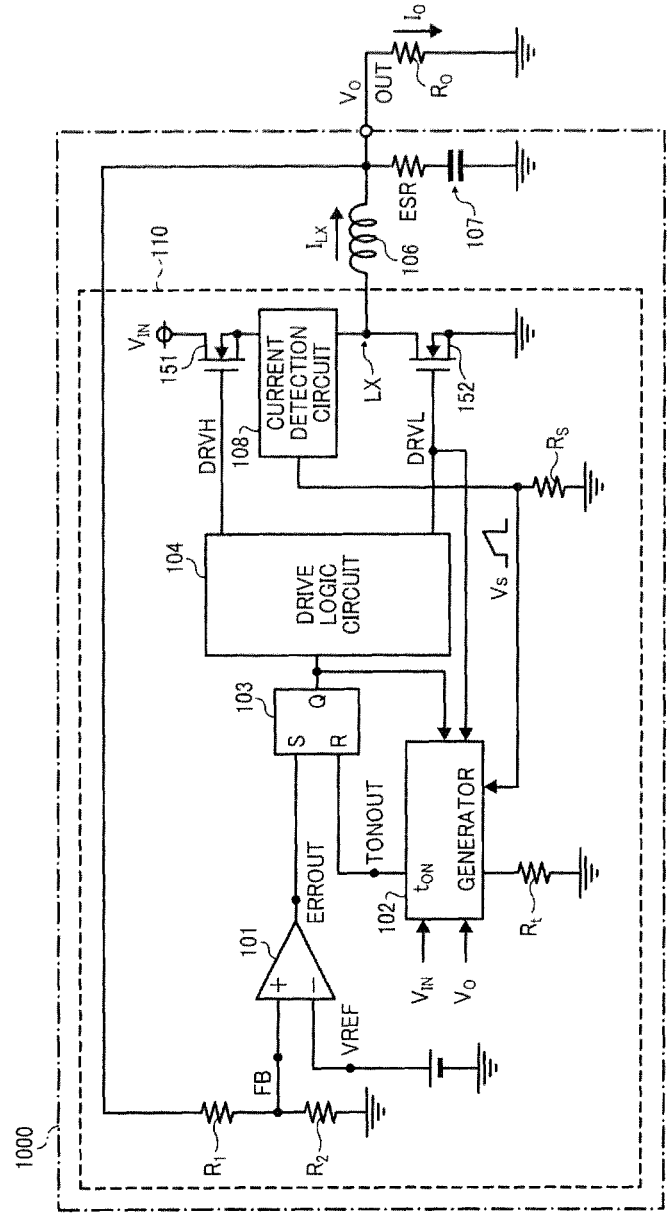
FIG. 14 is a circuit diagram illustrating another conventional power supply device.
Figure 15:
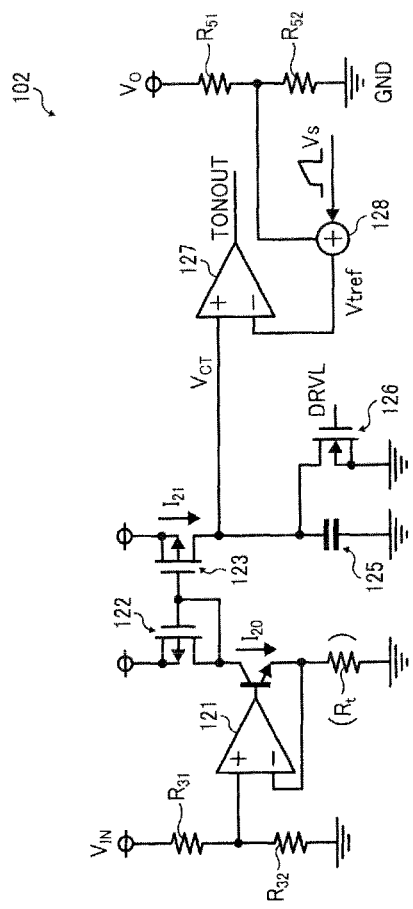
FIG. 15 is a circuit diagram illustrating a $T_{ON}$ generator in the power supply device shown in FIG. 14.

FIG. 10 is a circuit diagram illustrating a switching-time control circuit 3E according to a fourth embodiment. The switching-time control circuit 3E in the present embodiment includes an on-duty detection circuit 4E instead of the on-duty detection circuit 4 in the switching-time control circuit 3 according to the first embodiment. Herein, the on-duty detection circuit 4E further includes a dividing circuit 49 to divide the reference voltage VRT for output to the switching element SW3. More specifically, the dividing circuit 49, serving as a first dividing circuit, is connected between the reference voltage source 44 and the third switching element SW3, to divide the second reference voltage VRT for output to the third switching element SW3.

The dividing circuit 49 is constituted by resistors 491 and 492 connected in serial between the reference voltage source 44 and the ground. Accordingly, in FIG. 10, the capacitor 43 is charged to the reference voltage VRT after dividing, the detection voltage Von1 output from the on-duty detection circuit 4E is calculated by the following formula, using a resistance Rv1 of the resistor 491 and a resistance Rv2 of the resistor 492.

$$(7)Von1 = \frac{ton1}{ton1 + ton2} \times VRT \times \frac{Rv1}{Rv1 + Rv2} \quad (21)$$

For example, when an output voltage from a band-gap reference circuit is used for generating the reference voltage VRT, the reference voltage VRT is set to 1.26 V. In the present embodiment, since the reference voltage VRT is divided by the resistors 491 and 492, the maximum value of the detection voltage Von1 is smaller than that of the detection voltage Von1 in the first embodiment. Accordingly, an input voltage range of the comparator 53 becomes smaller, and the consumption of current or the chip size can be further smaller. In addition, the switching regulator 1E can operate at an input voltage VIN lower than that of the first embodiment.

It is to be noted that, similarly to the present embodiment, the dividing circuit 49 may be provided between the reference voltage source 44 and the switching element SW3 in the on-duty detection circuits 4A, 4B, 4C, and 4D.

Numerous additional modifications and variations are possible in light of the above teachings. It is therefore to be understood that, within the scope of the appended claims, the disclosure of this patent specification may be practiced otherwise than as specifically described herein.

What is claimed is:

1. A switching regulator to convert an input voltage into a predetermined output voltage, the switching regulator comprising:
   an input terminal to which the input voltage is input;
   an output terminal to which the output voltage is output;
   a first switching element connected between the input terminal and the output terminal;
   a second switching element connected between the output terminal and a ground;
   a switching-time control circuit to generate a first switching-time control signal indicating finish timing of an ON-period of the first switching element, based on a ratio of a length of the ON-period of the first switching element to a sum of lengths of ON-periods of the first switching element and the second switching element;

a first comparator to compare a feedback voltage corresponding to the output voltage with a predetermined first reference voltage, and generate a second switching-time control signal indicating finish timing of the ON-period of the second switching element when the feedback voltage is smaller than the first reference voltage; and a switching-element control circuit to control on/off operation of the first switching element and the second switching element so that the first switching element and the second switching element are turned on complementarily based on the first switching-time control signal and the second switching-time control signal.

2. The switching regulator according to claim 1, wherein the switching-time control circuit comprises:

an on-duty detection circuit to output a detection voltage indicating the ratio of the length of the ON-period of the first switching element to the sum of the lengths of the ON-periods of the first switching element and the second switching element; and an ON-period control circuit to generate the first switching-time control signal based on the detection voltage.

3. The switching regulator according to claim 2, wherein the on-duty detection circuit of the switching-time control circuit comprises:

a reference voltage source to generate a predetermined second reference voltage;

a third switching element having one terminal connected to the reference voltage source, controlled so that the third switching element is turned on and off in conjunction with the first switching element;

a fourth switching element having one terminal connected between the other terminal of the third switching element and the ground, controlled so that the fourth switching element is turned on and off in conjunction with the second switching element;

an integral resistive element having one terminal connected to a junction node between the third switching element and the fourth switching element; and a first capacitance element connected between the other terminal of the integral resistive element and the ground, the first capacitance element being charged to the predetermined second reference voltage by connecting the reference voltage source via the integrated resistive element when the third switching element is on state, and being discharged to a ground voltage by connecting the ground via the integrated resistive element when the fourth switching element is on state, wherein the on-duty detection circuit outputs a voltage across the first capacitance element as the detection voltage, wherein the ON-period control circuit of the switching-time control circuit comprises:

a reference current source to output a predetermined reference current;

a fifth switching element, controlled so that the fifth switching element is turned off while the first switching element is on state and is turned off while the first switching element is off state;

a second capacitance element connected between the reference current source and the ground and connected in parallel to the fifth switching element; the second capacitance element being charged by the reference current source when the fifth switching element is off state, and being discharged to the ground voltage by connecting the ground when the fifth switching element is on state; and a second comparator to compare the detection voltage from the on-duty detection circuit with a voltage across the second capacitive element, and output the first switching-time control signal when the voltage across the second capacitive element is greater than the detection voltage.

4. The switching regulator according to claim 3, in the on-duty detection circuit further comprises a first dividing circuit, connected between the reference voltage source and the third switching element, to divide the second reference voltage for output to the third switching element.

5. The switching regulator according to claim 2, wherein the on-duty detection circuit of the switching period control circuit comprises:

a reference voltage source to generate a predetermined second reference voltage;

a third switching element having one terminal connected to the reference voltage source, controlled so that the third switching element is turned on and off in conjunction with the first switching element;

a charge-reference current source, connected to the other terminal of the third switching element, to generate a predetermined charge current;

a fourth switching element having one terminal connected to the ground, controlled so that the fourth switching element is turned on and off in conjunction with the second switching element;

a discharge-reference current source, connected between the other terminal of the fourth switching element and the charge-reference current source, to output a predetermined discharge current; and a first capacitance element connected between the ground and a junction node between the charge-reference current source and the discharge-reference current source, the first capacitive element being charged at the predetermined charge current by connecting the reference voltage source via the charge-reference current source when the third switching element is turned on and being discharged at the predetermined discharge current by connecting the ground via the discharge-reference current source when the fourth switching element is turned on, wherein the on-duty detection circuit outputs a voltage across the first capacitance element as the detection voltage;

wherein the ON-period control circuit of the switching-time control circuit comprises:

a reference current source to output a predetermined reference current;

a fifth switching element controlled so that the fifth switching element is turned off while the first switching element is on state and is turned off while the first switching element is off state;

a second capacitive element connected between the reference current source and the ground and connected in parallel to the fifth switching element, the second capacitance element being charged by the reference current source when the fifth switching element is off state and being discharged by connecting the ground when the fifth switching element is on state; and a second comparator to compare the detection voltage from the on-duty detection circuit with a voltage across the second capacitive element, and output the first switching-time control signal when the voltage across the second capacitive element is greater than the detection voltage.

6. The switching regulator according to claim 5, wherein the on-duty detection circuit further comprises a first dividing circuit, connected between the reference voltage source and the third switching element, to divide the second reference voltage for output to the third switching element.

7. The switching regulator according to claim 1, further comprising a second dividing circuit to generate the feedback voltage corresponding to the output voltage and output the feedback voltage to the first comparator.

8. The switching regulator according to claim 1, wherein the switching-element control circuit controls the first switching element and the second switching element to cause a time-averaged voltage of the output voltage to be substantially constant.

9. An electronic device comprising the switching regulator of claim 1.

10. The electronic device switching according to claim 9, further comprising a low-pass filter connected to the output terminal of the switching regulator,
wherein the output voltage is output through the low pass filter.

11. A switching regulator to convert an input voltage into a predetermined output voltage,
the switching regulator comprising:
an input terminal to which the input voltage is input,
an output terminal to which the output voltage is output;
a first switching element connected between the input terminal and the output terminal;
a second switching element connected between the output terminal and a ground;
a first comparator to compare a feedback voltage corresponding to the output voltage with a predetermined first reference voltage, and generate a first switching-time control signal indicating finish timing of ON-period of the first switching element, when the feedback voltage is smaller than the first reference voltage;
a switching-time control circuit to generate a second switching-time control signal indicating finish timing of an ON-period of the second switching element, based on a ratio of a length of the ON-period of the second switching element to a sum of lengths of the ON-periods of the first switching element and the second switching element; and
a switching-element control circuit to control on/off operation of the first switching element and the second switching element so that the first switching element and the second switching element are turned on complementarily based on the first switching-time control signal and the second switching-time control signal.

12. The switching regulator according to claim 11, wherein the switching-time control circuit comprises:
an on-duty detection circuit to output a detection voltage indicating the ratio of the length of the ON-period of the second switching element to the sum of the lengths of the ON-periods of the first switching element and the second switching element; and
an ON-period control circuit to generate the second switching-time control signal based on the detection voltage.

13. The switching regulator according to claim 12, wherein the on-duty detection circuit of the switching-time control circuit comprises:
a reference voltage source to generate a predetermined second reference voltage;

a third switching element having one terminal connected to the reference voltage source, controlled so that the third switching element is turned on and off in conjunction with the second switching element;
a fourth switching element having one terminal connected to the other terminal of the third switching element, controlled so that the fourth switching element is turned on and off in conjunction with the first switching element;
an integral resistive element having one terminal connected between a ground and a junction node between the third switching element and the fourth switching element; and
a first capacitance element connected between the other terminal of the integral resistive element and the ground, the first capacitance element being charged to the predetermined second reference voltage by connecting the reference voltage source via the integrated resistive element when the third switching element is on state, and being discharged to a ground voltage by connecting the ground via the integrated resistive element when the fourth switching element is on state;
wherein the on-duty detection circuit outputs a voltage across the first capacitance element as the detection voltage;
wherein the ON-period control circuit of the switching-time control circuit comprises:
a reference current source to output a predetermined reference current;
a fifth switching element, controlled so that the fifth switching element is turned off while the second switching element is on state and is turned off while the second switching element is off state;
a second capacitive element connected between the reference current source and the ground and connected in parallel to the fifth switching element, the second capacitance element being charged by the reference current source when the fifth switching element is off state and being discharged to the ground voltage by connecting the ground when the fifth switching element is on state; and
a second comparator to compare the detection voltage from the on-duty detection circuit and the voltage across the second capacitive element, and output the second switching-time control signal when the voltage across the second capacitive element is greater than the detection voltage.

14. The switching regulator according to claim 13, wherein the on-duty detection circuit further comprises a first dividing circuit, connected between the reference voltage source and the third switching element, to divide the second reference voltage for output to the third switching element.

15. The switching regulator according to claim 12, wherein the on-duty detection circuit of the switching-time control circuit comprises:
a reference voltage source to generate a predetermined second reference voltage;
a third switching element having one terminal connected to the reference voltage source, controlled so that the third switching element is turned on and off in conjunction with the second switching element;
a charge-reference current source, connected to the other terminal of the third switching element, to generate a predetermined charge current;

a fourth switching element having one terminal connected to the ground, controlled so that the fourth switching element is turned on and off in conjunction with the first switching element;

a discharge-reference current source, connected between the other terminal of the fourth switching element and the charge-reference current source, to output a predetermined discharge current; and a first capacitance element connected between the ground and a junction node between the charge-reference current source and the discharge-reference current source, the first capacitive element being charged at the predetermined charge current by connecting the reference voltage source via the charge-reference current source when the third switching element is turned on and being discharged at the predetermined discharge current by connecting the ground via the discharge-reference current source when the fourth switching element is turned on, wherein the on-duty detection circuit outputs a voltage across the first capacitance element as the detection voltage;

wherein the ON-period control circuit of the switching-time control circuit comprises:

a reference current source to output a predetermined reference current;

a fifth switching element, controlled so that the fifth switching element is turned off while the second switching element is on state and is turned off while the second switching element is off state;

a second capacitive element connected between the reference current source and the ground and connected in parallel to the fifth switching element, the second capacitance element being charged by the reference current source when the fifth switching element is off state and being discharged to the ground voltage by connecting the ground when the fifth switching element is on state; and a second comparator to compare the detection voltage from the on-duty circuit and the voltage across the second capacitive element, and output the first switching-time control signal when the voltage across the second capacitive element is greater than the detection voltage.

16. The switching regulator according to claim 15, wherein the on-duty detection circuit further comprises a first dividing circuit, connected between the reference voltage source and the third switching element, to divide the second reference voltage for output to the third switching element.

17. The switching regulator according to claim 11, further comprising a second dividing circuit to generate the feedback voltage corresponding to the output voltage and output the feedback voltage to the first comparator.

18. The switching regulator according to claim 11, wherein the switching-element control circuit controls the first switching element and the second switching element to cause a time-averaged voltage of the output voltage to be substantially constant.

19. An electronic device comprising the switching regulator of claim 11.

20. The electronic device switching according to claim 19, further comprising a low-pass filter connected to the output terminal of the switching regulator, wherein the output voltage is output through the low pass filter.

* * * * *